(12) United States Patent
Hanzawa et al.

(10) Patent No.: US 9,020,706 B2
(45) Date of Patent: Apr. 28, 2015

(54) VEHICLE MOTION CONTROL APPARATUS

(75) Inventors: Masatoshi Hanzawa, Kariya (JP);
Masaki Maruyama, Nagoya (JP);
Hirofumi Nitta, Obu (JP); Yuichi Mizutani, Aichi-ken (JP); Mitsuhiro Tokimasa, Obu (JP); Yasuhiko Mukai, Anjyo (JP); Junpei Tatsukawa, Chiryu (JP)

(73) Assignees: Aisin Seiki Kabushiki Kaisha, Kariya-Shi, Aichi-Ken (JP); Advics Co., Ltd., Kariya-Shi, Aichi-Ken (JP); Denso Corporation, Kariya-Shi, Aichi-Ken (JP)

( * ) Notice: Subject to any disclaimer, the term of this patent is extended or adjusted under 35 U.S.C. 154(b) by 709 days.

(21) Appl. No.: 13/282,578

(22) Filed: Oct. 27, 2011

(65) Prior Publication Data

US 2012/0109410 A1 May 3, 2012

(30) Foreign Application Priority Data

Oct. 29, 2010 (JP) ................................ 2010-244549

(51) Int. Cl.
*G06F 17/00* (2006.01)
*B60W 30/02* (2012.01)
(Continued)

(52) U.S. Cl.
CPC ............. *B60W 30/02* (2013.01); *B62D 15/025* (2013.01); *B60W 10/20* (2013.01); *B60W 30/12* (2013.01); *B60W 2720/12* (2013.01); *B60W 2720/125* (2013.01)

(58) Field of Classification Search
CPC ..... B60W 10/20; B60W 10/22; B60W 30/04; B60W 50/035
USPC ............. 701/1, 36, 37, 41, 45, 48, 70, 71, 79, 701/83, 84, 91, 96, 110, 121, 29.1, 29.2
See application file for complete search history.

(56) References Cited

U.S. PATENT DOCUMENTS 4,951,208 A * 8/1990 Etoh ................................ 701/97
5,586,032 A * 12/1996 Kallenbach et al. ............. 701/45
(Continued)

FOREIGN PATENT DOCUMENTS

JP 05-162566 A 6/1993
JP 3058966 B2 * 7/2000
(Continued)

OTHER PUBLICATIONS

Office Action issued on Apr. 1, 2014, by the Japanese Patent Office in corresponding Japanese Patent Application No. 2010-244549 and an English Translation of the Office Action. (8 pages).

*Primary Examiner* — Thomas G Black
*Assistant Examiner* — Ce Li
(74) *Attorney, Agent, or Firm* — Buchanan Ingersoll & Rooney PC

(57) ABSTRACT

A vehicle motion control apparatus configured to control a plurality of control objects in a same direction of vehicle motion control to achieve a requested control amount is provided. The vehicle motion control apparatus includes a control object selection unit which is configured to determine priority of the control objects used for the vehicle motion control based on a priority determination condition, to select a control object from among the plurality of control objects. The control object selection unit includes a control object selection timing determination section configured to detect a change in the priority determination condition, and cause the control object selection unit to reselect a control object at a timing of the change detection as a selection timing.

7 Claims, 19 Drawing Sheets

(51) Int. Cl.
*B62D 15/02* (2006.01)
*B60W 10/20* (2006.01)
*B60W 30/12* (2006.01)

(56) References Cited

U.S. PATENT DOCUMENTS

| | | | |
|---|---|---|---|
| 5,991,675 A * | 11/1999 | Asanuma | 701/41 |
| 7,463,964 B2 * | 12/2008 | Ushiroda et al. | 701/80 |
| 2002/0099487 A1 * | 7/2002 | Suganuma et al. | 701/48 |
| 2004/0083043 A1 * | 4/2004 | Akiyama et al. | 701/48 |
| 2004/0128044 A1 * | 7/2004 | Hac | 701/48 |
| 2005/0085988 A1 * | 4/2005 | Ushiroda et al. | 701/80 |
| 2006/0208564 A1 | 9/2006 | Yuda et al. | |
| 2007/0004553 A1 * | 1/2007 | Oikawa et al. | 477/97 |
| 2007/0088484 A1 | 4/2007 | Fujita | |
| 2007/0112483 A1 * | 5/2007 | Jeong | 701/22 |
| 2007/0138986 A1 * | 6/2007 | Kutsuna et al. | 318/254 |
| 2010/0185375 A1 | 7/2010 | Hanzawa et al. | |
| 2011/0307152 A1 * | 12/2011 | Shono et al. | 701/54 |

FOREIGN PATENT DOCUMENTS

| | | |
|---|---|---|
| JP | 4297150 B2 | 7/2009 |
| JP | 4455379 B2 | 4/2010 |

* cited by examiner

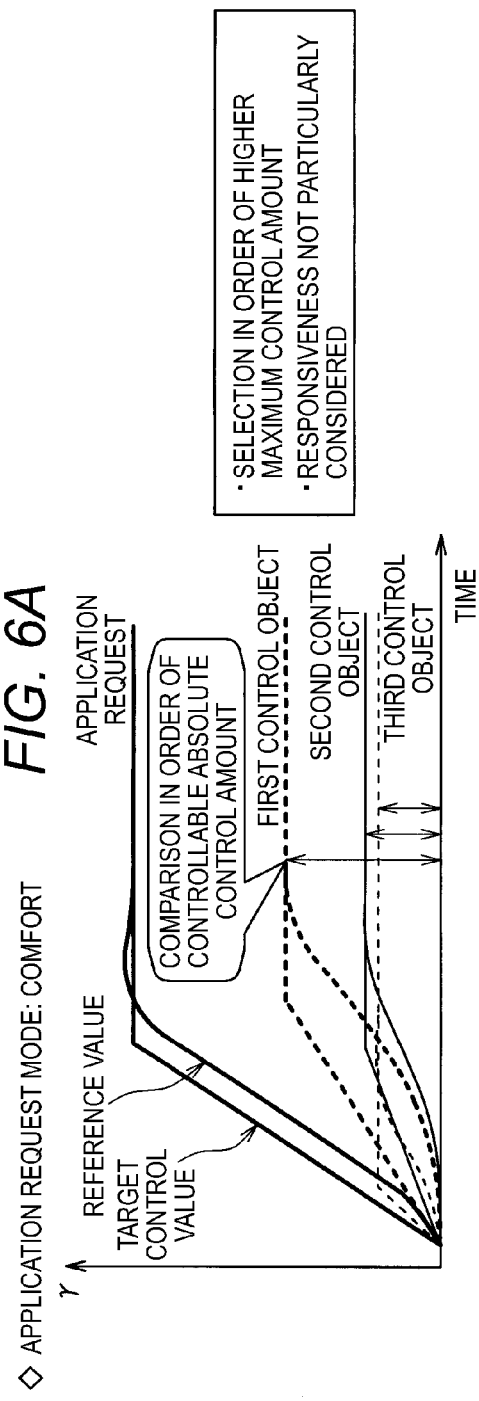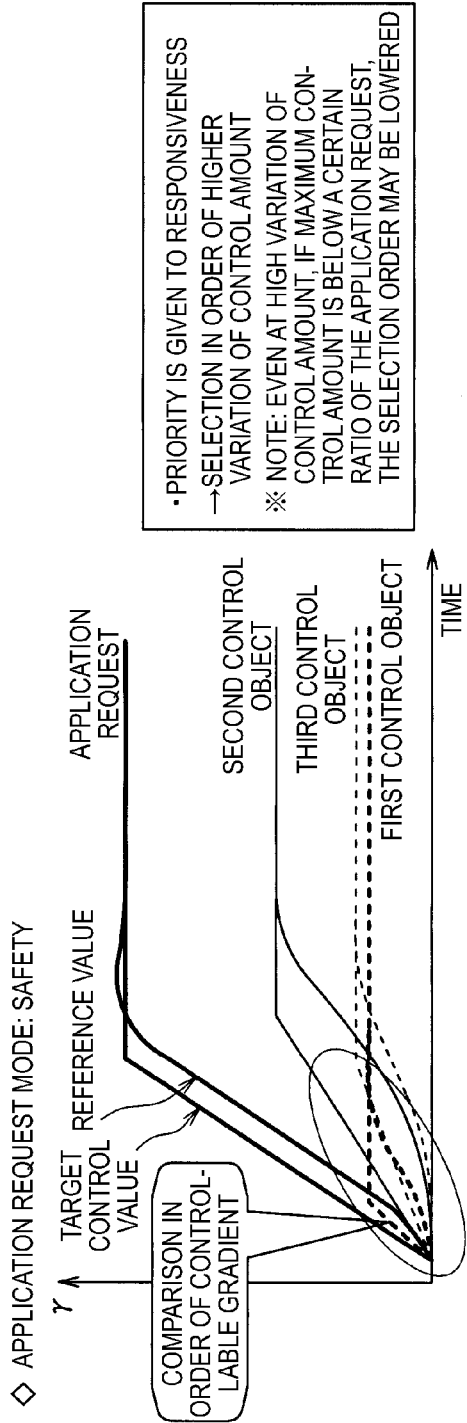

FIG. 7A

| SELECTION OF 1ST CONTROL OBJECT APPLICATION REQUESTED VARIATION ↓ / APPLICATION REQUESTED YAW RATE → | 7: ALL ACHIEVE | 6: REAR STEERING AND BRAKE ACHIEVE | 5: REAR STEERING AND FRONT STEERING ACHIEVE | 3: FRONT STEERING AND BRAKE ACHIEVE | 4: REAR STEERING ONLY ACHIEVE | 2: BRAKE ONLY ACHIEVE | 1: FRONT STEERING ONLY ACHIEVE | 0: NONE ACHIEVE |
|---|---|---|---|---|---|---|---|---|
| 7: ALL ACHIEVE | 4: SELECTION OF MAXIMUM VARIATION | 7: BRAKE AND REAR STEERING SELECT MAXIMUM VALUE | 6: FRONT STEERING AND REAR STEERING SELECT MAXIMUM VALUE | 5: FRONT STEERING AND BRAKE SELECT MAXIMUM VALUE | 4: SELECTION OF MAXIMUM VARIATION | 2: BRAKE | 1: FRONT STEERING | 8: FRONT STEERING AND REAR STEERING SELECT MAXIMUM VALUE |
| 6: REAR STEERING AND BRAKE ACHIEVE | 4: SELECTION OF MAXIMUM VARIATION | 4: SELECTION OF MAXIMUM VARIATION | 3: REAR STEERING | 2: BRAKE | 3: REAR STEERING | 2: BRAKE | 1: FRONT STEERING | 7: BRAKE AND REAR STEERING SELECT MAXIMUM VALUE |
| 5: REAR STEERING AND FRONT STEERING ACHIEVE | 4: SELECTION OF MAXIMUM VARIATION | 3: REAR STEERING | 4: SELECTION OF MAXIMUM VARIATION | 1: FRONT STEERING | 3: REAR STEERING | 2: BRAKE | 1: FRONT STEERING | 6: FRONST STEER AND REAR STEERING SELECT MAXIMUM VALUE |
| 3: FRONT STEERING AND BRAKE ACHIEVE | 4: SELECTION OF MAXIMUM VARIATION | 2: BRAKE | 1: FRONT STEERING | 4: SELECTION OF MAXIMUM VARIATION | 4: SELECTION OF MAXIMUM VARIATION | 2: BRAKE | 1: FRONT STEERING | 5: FRONT STEERING AND BRAKE SELECT MAXIMUM VALUE |
| 4: REAR STEERING ONLY ACHIEVE | 3: REAR STEERING | 3: REAR STEERING | 3: REAR STEERING | 3: REAR STEERING | 3: REAR STEERING | 3: REAR STEERING | 3: REAR STEERING | 3: REAR STEERING |
| 2: BRAKE ONLY ACHIEVE | 2: BRAKE | 2: BRAKE | 2: BRAKE | 2: BRAKE | 2: BRAKE | 2: BRAKE | 2: BRAKE | 2: BRAKE |
| 1: FRONT STEERING ONLY ACHIEVE | 1: FRONT STEERING | 1: FRONT STEERING | 1: FRONT STEERING | 1: FRONT STEERING | 1: FRONT STEERING | 1: FRONT STEERING | 1: FRONT STEERING | 1: FRONT STEERING |
| 0: NONE ACHIEVE | 4: SELECTION OF MAXIMUM VARIATION | 4: SELECTION OF MAXIMUM VARIATION | 4: SELECTION OF MAXIMUM VARIATION | 4: SELECTION OF MAXIMUM VARIATION | 4: SELECTION OF MAXIMUM VARIATION | 4: SELECTION OF MAXIMUM VARIATION | 4: SELECTION OF MAXIMUM VARIATION | 0: NONE ACHIEVE |

FIG. 7B

| 2ND SELECTION 2ND CONTROL OBJECT SELECTION ASSUME THAT 1ST CONTROL OBJECT IS DETERMINED BY 1ST SELECTION / APPLICATION REQUESTED VARIATION | APPLICATION REQUESTED YAW RATE | | | | | | | |
|---|---|---|---|---|---|---|---|---|
| | 7: ALL ACHIEVE | 6: REAR STEERING AND BRAKE ACHIEVE | 5: REAR STEERING AND FRONT STEERING ACHIEVE | 3: FRONT STEERING AND BRAKE ACHIEVE | 4: REAR STEERING ONLY ACHIEVE | 2: BRAKE ONLY ACHIEVE | 1: FRONT STEERING ONLY ACHIEVE | 0: NONE ACHIEVE |
| 7: ALL ACHIEVE ※1ST IS A CONTROL OBJECT WITH MAXIMUM VARIATION | NO 2ND SELECTION | NO 2ND SELECTION | NO 2ND SELECTION | NO 2ND SELECTION | NO 2ND SELECTION | NO 2ND SELECTION | NO 2ND SELECTION | 6: SELECTION OF MAXIMUM VALUE, OTHER THAN 1ST |
| 6: REAR STEERING AND BRAKE ACHIEVE ※1ST IS REAR STEERING OR BRAKE | NO 2ND SELECTION | NO 2ND SELECTION | NO 2ND SELECTION | NO 2ND SELECTION | NO 2ND SELECTION | NO 2ND SELECTION | 1: FRONT STEERING | 6: SELECTION OF MAXIMUM VALUE, OTHER THAN 1ST |
| 5: REAR STEERING AND FRONT STEERING ACHIEVE ※1ST IS REAR STEERING OR FRONT STEERING | NO 2ND SELECTION | NO 2ND SELECTION | NO 2ND SELECTION | NO 2ND SELECTION | NO 2ND SELECTION | 2: BRAKE | NO 2ND SELECTION | 6: SELECTION OF MAXIMUM VALUE, OTHER THAN 1ST |
| 3: FRONT STEERING AND BRAKE ACHIEVE ※1ST IS FRONT STEERING OR BRAKE | NO 2ND SELECTION | NO 2ND SELECTION | NO 2ND SELECTION | NO 2ND SELECTION | 3: REAR STEERING | NO 2ND SELECTION | NO 2ND SELECTION | 6: SELECTION OF MAXIMUM VALUE, OTHER THAN 1ST |
| 4: REAR STEERING ONLY ACHIEVE ※1ST IS REAR STEERING | NO 2ND SELECTION | NO 2ND SELECTION | NO 2ND SELECTION | 5: SELECTION OF MAXIMUM VALUE | NO 2ND SELECTION | 2: BRAKE | 1: FRONT STEERING | 5: SELECTION OF MAXIMUM VALUE |
| 2: BRAKE ONLY ACHIEVE ※1ST IS BRAKE | NO 2ND SELECTION | NO 2ND SELECTION | 5: SELECTION OF MAXIMUM VALUE | NO 2ND SELECTION | 3: REAR STEERING | NO 2ND SELECTION | 1: FRONT STEERING | 5: SELECTION OF MAXIMUM VALUE |
| 1: FRONT STEERING ONLY ACHIEVE ※1ST IS FRONT STEERING | NO 2ND SELECTION | 5: SELECTION OF MAXIMUM VALUE | NO 2ND SELECTION | NO 2ND SELECTION | 3: REAR STEERING | 2: BRAKE | NO 2ND SELECTION | 5: SELECTION OF MAXIMUM VALUE |
| 0: NONE ACHIEVE ※1ST IS CONTROL OBJECT WITH MAXIMUM VARIATION | 4: 2ND VARIATION SELECTION | 4: 2ND VARIATION SELECTION | 4: 2ND VARIATION SELECTION | 4: 2ND VARIATION SELECTION | 4: 2ND VARIATION SELECTION | 4: 2ND VARIATION SELECTION | 4: 2ND VARIATION SELECTION | 4: 2ND VARIATION SELECTION |

FIG. 7C

| 3RD SELECTION 3RD CONTROL OBJECT SELECTION APPLICATION REQUESTED VARIATION | APPLICATION REQUESTED YAW RATE ||||||||
|---|---|---|---|---|---|---|---|---|
| | 7: ALL ACHIEVE | 6: REAR STEERING AND BRAKE ACHIEVE | 5: REAR STEERING AND FRONT STEERING ACHIEVE | 3: FRONT STEERING AND BRAKE ACHIEVE | 4: REAR STEERING ONLY ACHIEVE | 2: BRAKE ONLY ACHIEVE | 1: FRONT STEERING ONLY ACHIEVE | 0: NONE ACHIEVE |
| 7: ALL ACHIEVE | NO 2ND SELECTION | NO 2ND SELECTION | NO 2ND SELECTION | NO 2ND SELECTION | NO 2ND SELECTION | NO 2ND SELECTION | NO 2ND SELECTION | ※2 TARGET VALUE SUPPLEMENT 3RD CONTROL OBJECT |
| 6: REAR STEERING AND BRAKE ACHIEVE | NO 2ND SELECTION | NO 2ND SELECTION | NO 2ND SELECTION | NO 2ND SELECTION | NO 2ND SELECTION | NO 2ND SELECTION | NO 3RD SELECTION | ※2 TARGET VALUE SUPPLEMENT 3RD CONTROL OBJECT |
| 5: REAR STEERING AND FRONT STEERING ACHIEVE | NO 2ND SELECTION | NO 2ND SELECTION | NO 2ND SELECTION | NO 2ND SELECTION | NO 3RD SELECTION | NO 2ND SELECTION | NO 2ND SELECTION | ※2 TARGET VALUE SUPPLEMENT 3RD CONTROL OBJECT |
| 3: FRONT STEERING AND BRAKE ACHIEVE | NO 2ND SELECTION | NO 2ND SELECTION | NO 3RD SELECTION | NO 2ND SELECTION | NO 2ND SELECTION | NO 3RD SELECTION | NO 2ND SELECTION | ※2 TARGET VALUE SUPPLEMENT 3RD CONTROL OBJECT |
| 4: REAR STEERING ONLY ACHIEVE | NO 2ND SELECTION | NO 2ND SELECTION | NO 2ND SELECTION | NO 3RD SELECTION | NO 2ND SELECTION | NO 3RD SELECTION | NO 3RD SELECTION | ※2 TARGET VALUE SUPPLEMENT 3RD CONTROL OBJECT |
| 2: BRAKE ONLY ACHIEVE | NO 2ND SELECTION | NO 2ND SELECTION | NO 2ND SELECTION | NO 2ND SELECTION | NO 3RD SELECTION | NO 3RD SELECTION | NO 2ND SELECTION | ※2 TARGET VALUE SUPPLEMENT 3RD CONTROL OBJECT |
| 1: FRONT STEERING ONLY ACHIEVE | NO 2ND SELECTION | NO 3RD SELECTION | NO 2ND SELECTION | NO 2ND SELECTION | NO 3RD SELECTION | NO 3RD SELECTION | NO 2ND SELECTION | ※2 TARGET VALUE SUPPLEMENT 3RD CONTROL OBJECT |
| 0: NONE ACHIEVE | ※1 VARIATION SUPPLEMENT 3RD SELECTION | ※1 VARIATION SUPPLEMENT 3RD SELECTION | ※1 VARIATION SUPPLEMENT 3RD SELECTION | ※1 VARIATION SUPPLEMENT 3RD SELECTION | ※1 VARIATION SUPPLEMENT 3RD SELECTION | ※1 VARIATION SUPPLEMENT 3RD SELECTION | ※1 VARIATION SUPPLEMENT 3RD SELECTION | ※1 VARIATION SUPPLEMENT 3RD SELECTION |

FIG. 8A

| SELECTION OF 1ST CONTROL OBJECT / APPLICATION REQUESTED YAW RATE | APPLICATION REQUESTED VARIATION | | | | | | | | |
|---|---|---|---|---|---|---|---|---|---|
| | 7: ALL ACHIEVE | 6: REAR STEERING AND BRAKE ACHIEVE | 5: REAR STEERING AND FRONT STEERING ACHIEVE | 3: FRONT STEERING AND BRAKE ACHIEVE | 4: REAR STEERING ONLY ACHIEVE | 2: BRAKE ONLY ACHIEVE | 1: FRONT STEERING ONLY ACHIEVE | 0: NONE ACHIEVE |
| 7: ALL ACHIEVE | 4: SELECTION OF MAXIMUM VALUE | 7: BRAKE AND REAR STEERING SELECT MAXIMUM VARIATION | 6: FRONT STEERING AND REAR STEERING SELECT MAXIMUM VARIATION | 5: FRONT STEERING AND BRAKE ACHIEVE | 3: FRONT STEERING AND BRAKE ACHIEVE | 4: REAR STEERING ONLY ACHIEVE | 2: BRAKE ONLY ACHIEVE | 1: FRONT STEERING ONLY ACHIEVE | 8: FRONT STEERING AND REAR STEERING SELECT MAXIMUM VARIATION |
| 6: REAR STEERING AND BRAKE ACHIEVE | 4: SELECTION OF MAXIMUM VALUE | 4: SELECTION OF MAXIMUM VALUE | 3: REAR STEERING | 2: BRAKE | 3: REAR STEERING | 2: BRAKE | 1: FRONT STEERING | 7: BRAKE AND REAR STEERING SELECT MAXIMUM VARIATION |
| 5: REAR STEERING AND FRONT STEERING ACHIEVE | 4: SELECTION OF MAXIMUM VALUE | 3: REAR STEERING | 4: SELECTION OF MAXIMUM VALUE | 1: FRONT STEERING | 3: REAR STEERING | 2: BRAKE | 1: FRONT STEERING | 4: SELECTION OF MAXIMUM VALUE |
| 3: FRONT STEERING AND BRAKE ACHIEVE | 4: SELECTION OF MAXIMUM VALUE | 2: BRAKE | 1: FRONT STEERING | 4: SELECTION OF MAXIMUM VALUE | 4: SELECTION OF MAXIMUM VALUE | 2: BRAKE | 1: FRONT STEERING | 6: FRONT STEERING AND REAR STEERING SELECT MAXIMUM VARIATION |
| 4: REAR STEERING ONLY ACHIEVE | 3: REAR STEERING | 3: REAR STEERING | 3: REAR STEERING | 3: REAR STEERING | 3: REAR STEERING | 2: BRAKE | 1: FRONT STEERING | 5: FRONT STEERING AND BRAKE SELECT MAXIMUM VARIATION |
| 2: BRAKE ONLY ACHIEVE | 2: BRAKE | 2: BRAKE | 2: BRAKE | 2: BRAKE | 2: BRAKE | 2: BRAKE | 2: BRAKE | 3: REAR STEERING |
| 1: FRONT STEERING ONLY ACHIEVE | 1: FRONT STEERING | 1: FRONT STEERING | 1: FRONT STEERING | 1: FRONT STEERING | 1: FRONT STEERING | 1: FRONT STEERING | 1: FRONT STEERING | 2: BRAKE |
| 0: NONE ACHIEVE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE |

FIG. 8B

2ND SELECTION
2ND CONTROL OBJECT SELECTION
ASSUME THAT 1ST CONTROL OBJECT IS DETERMINED BY 1ST SELECTION

| APPLICATION REQUESTED YAW RATE ↓ \ APPLICATION REQUESTED VARIATION → | 7: ALL ACHIEVE | 6: REAR STEERING AND BRAKE ACHIEVE | 5: REAR STEERING AND FRONT STEERING ACHIEVE | 3: FRONT STEERING AND BRAKE ACHIEVE | 4: REAR STEERING ONLY ACHIEVE | 2: BRAKE ONLY ACHIEVE | 1: FRONT STEERING ONLY ACHIEVE | 0: NONE ACHIEVE |
|---|---|---|---|---|---|---|---|---|
| 7: ALL ACHIEVE ※1ST IS A CONTROL OBJECT WITH MAXIMUM VARIATION | NO 2ND SELECTION | NO 2ND SELECTION | NO 2ND SELECTION | NO 2ND SELECTION | NO 2ND SELECTION | NO 2ND SELECTION | NO 2ND SELECTION | 6:SELECTION OF MAXIMUM VARIATION, OTHER THAN 1ST |
| 6: REAR STEERING AND BRAKE ACHIEVE ※1ST IS REAR STEERING OR BRAKE | NO 2ND SELECTION | NO 2ND SELECTION | NO 2ND SELECTION | NO 2ND SELECTION | NO 2ND SELECTION | NO 2ND SELECTION | 1:FRONT STEERING | 6:SELECTION OF MAXIMUM VARIATION, OTHER THAN 1ST |
| 5: REAR STEERING AND FRONT STEERING ACHIEVE ※1ST IS REAR STEERING OR FRONT STEERING | NO 2ND SELECTION | NO 2ND SELECTION | NO 2ND SELECTION | NO 2ND SELECTION | NO 2ND SELECTION | 2:BRAKE | NO 2ND SELECTION | 6:SELECTION OF MAXIMUM VARIATION, OTHER THAN 1ST |
| 3: FRONT STEERING AND BRAKE ACHIEVE ※1ST IS FRONT STEERING OR BRAKE | NO 2ND SELECTION | NO 2ND SELECTION | NO 2ND SELECTION | NO 2ND SELECTION | 3:REAR STEERING | NO 2ND SELECTION | NO 2ND SELECTION | 6:SELECTION OF MAXIMUM VARIATION, OTHER THAN 1ST |
| 4: REAR STEERING ONLY ACHIEVE ※1ST IS REAR STEERING | NO 2ND SELECTION | NO 2ND SELECTION | 5:SELECTION OF MAXIMUM VARIATION | 5:SELECTION OF MAXIMUM VARIATION | NO 2ND SELECTION | 2:BRAKE | 1:FRONT STEERING | 5: SELECTION OF MAXIMUM VARIATION |
| 2: BRAKE ONLY ACHIEVE ※1ST IS BRAKE | NO 2ND SELECTION | NO 2ND SELECTION | NO 2ND SELECTION | NO 2ND SELECTION | 3:REAR STEERING | NO 2ND SELECTION | 1:FRONT STEERING | 5: SELECTION OF MAXIMUM VARIATION |
| 1: FRONT STEERING ONLY ACHIEVE ※1ST IS FRONT STEERING | NO 2ND SELECTION | NO 2ND SELECTION | NO 2ND SELECTION | NO 2ND SELECTION | 3:REAR STEERING | 2:BRAKE | NO 2ND SELECTION | 5: SELECTION OF MAXIMUM VARIATION |
| 0: NONE ACHIEVE ※1ST IS CONTROL OBJECT WITH MAXIMUM VARIATION | 4:2ND VALUE SELECTION | 4:2ND VALUE SELECTION | 4:2ND VALUE SELECTION | 4:2ND VALUE SELECTION | 4:2ND VALUE SELECTION | 4:2ND VALUE SELECTION | 4:2ND VALUE SELECTION | 4:2ND VALUE SELECTION |

FIG. 8C

| 3RD SELECTION / 3RD CONTROL OBJECT SELECTION / APPLICATION REQUESTED YAW RATE | APPLICATION REQUESTED VARIATION | | | | | | | |
|---|---|---|---|---|---|---|---|---|
| | 7: ALL ACHIEVE | 6: REAR STEERING AND BRAKE ACHIEVE | 5: REAR STEERING AND FRONT STEERING ACHIEVE | 3: FRONT STEERING AND BRAKE ACHIEVE | 4: REAR STEERING ONLY ACHIEVE | 2: BRAKE ONLY ACHIEVE | 1: FRONT STEERING ONLY ACHIEVE | 0: NONE ACHIEVE |
| 7: ALL ACHIEVE | NO 2ND SELECTION | NO 2ND SELECTION | NO 2ND SELECTION | NO 2ND SELECTION | NO 2ND SELECTION | NO 2ND SELECTION | NO 2ND SELECTION | ※2 VARIATION SUPPLEMENT 3RD CONTROL OBJECT |
| 6: REAR STEERING AND BRAKE ACHIEVE | NO 2ND SELECTION | NO 2ND SELECTION | NO 2ND SELECTION | NO 2ND SELECTION | NO 2ND SELECTION | NO 2ND SELECTION | NO 3RD SELECTION | ※2 VARIATION SUPPLEMENT 3RD CONTROL OBJECT |
| 5: REAR STEERING AND FRONT STEERING ACHIEVE | NO 2ND SELECTION | NO 2ND SELECTION | NO 2ND SELECTION | NO 2ND SELECTION | NO 2ND SELECTION | NO 3RD SELECTION | NO 2ND SELECTION | ※2 VARIATION SUPPLEMENT 3RD CONTROL OBJECT |
| 3: FRONT STEERING AND BRAKE ACHIEVE | NO 2ND SELECTION | NO 2ND SELECTION | NO 2ND SELECTION | NO 3RD SELECTION | NO 2ND SELECTION | NO 2ND SELECTION | NO 2ND SELECTION | ※2 VARIATION SUPPLEMENT 3RD CONTROL OBJECT |
| 4: REAR STEERING ONLY ACHIEVE | NO 2ND SELECTION | NO 2ND SELECTION | NO 2ND SELECTION | NO 2ND SELECTION | NO 3RD SELECTION | NO 3RD SELECTION | NO 3RD SELECTION | ※2 VARIATION SUPPLEMENT 3RD CONTROL OBJECT |
| 2: BRAKE ONLY ACHIEVE | NO 2ND SELECTION | NO 2ND SELECTION | NO 2ND SELECTION | NO 3RD SELECTION | NO 3RD SELECTION | NO 2ND SELECTION | NO 3RD SELECTION | ※2 VARIATION SUPPLEMENT 3RD CONTROL OBJECT |
| 1: FRONT STEERING ONLY ACHIEVE | NO 2ND SELECTION | NO 2ND SELECTION | NO 2ND SELECTION | NO 2ND SELECTION | NO 3RD SELECTION | NO 3RD SELECTION | NO 2ND SELECTION | ※2 VARIATION SUPPLEMENT 3RD CONTROL OBJECT |
| 0: NONE ACHIEVE | ※1 TARGET VALUE SUPPLEMENT 3RD SELECTION | ※1 TARGET VALUE SUPPLEMENT 3RD SELECTION | ※1 TARGET VALUE SUPPLEMENT 3RD SELECTION | ※1 TARGET VALUE SUPPLEMENT 3RD SELECTION | ※1 TARGET VALUE SUPPLEMENT 3RD SELECTION | ※1 TARGET VALUE SUPPLEMENT 3RD SELECTION | ※1 TARGET VALUE SUPPLEMENT 3RD SELECTION | ※1 TARGET VALUE SUPPLEMENT 3RD SELECTION |

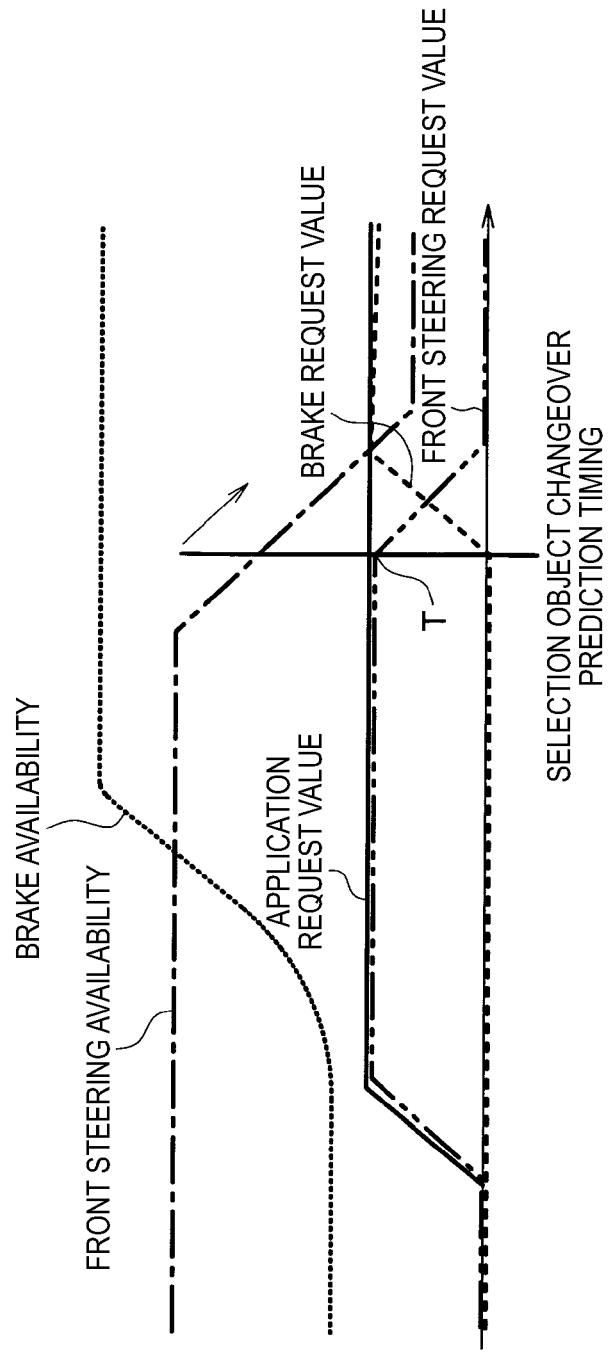

VEHICLE MOTION CONTROL APPARATUS

CROSS REFERENCE TO RELATED APPLICATIONS

This application is based on and claims priority under 35 U.S.C. §119 to Japanese Patent Application 2010-244549, filed on Oct. 29, 2010, the entire content of which is incorporated herein by reference.

BACKGROUND

1. Field of the Invention

The present invention relates to a vehicle motion control apparatus cooperatively using a plurality of control objects.

2. Description of Related Art

JP-B-4297150 describes a vehicle in which when an oversteer (hereinafter referred to as 'OS') state or an understeer (hereinafter referred to as 'US') state of a vehicle occurs, the distribution of driving force to respective front and rear wheels is first changed, if the oversteer or understeer state still progresses further, then a steering angle is corrected, and if the oversteer or understeer state still progresses further, then selective braking is performed on a selected wheel.

JP-B-4455379 describes a vehicle US suppressing apparatus in which as an increase in the amount of US, reactive force suppressing control by an electric power steering device (hereinafter referred to as 'EPS'), alarming by an alarm device, and distributing of braking forces to respective wheels are performed sequentially in this order.

However, the vehicle described in JP-B-4297150 merely determines the control device used to perform the control operations and the order thereof in order to suppress the OS state or US state. Further, the vehicle US suppressing apparatus described in JP-B-4455379 merely sequentially operates a plurality of control objects to supplement the amount of control in a stepwise manner in order to realize a required control value to suppress US. That is, although JP-B-4297150 and JP-B-4455379 describe that the lateral motion of a vehicle is controlled in combination with the plurality of control objects, they do not consider e.g. which control object should be operated with high priority based on the controllable ranges (availability) of respective control devices in order to perform a more optimal control. For example, when the control amount, which is an item of the availability, is different according to the control objects, determining the control object with reference to only the control amount cannot realize well-responsive control output if fast control response e.g. in emergency is required. Thus, it is preferred to perform an optimal control to the vehicle motion using a plurality of control objects.

In the meantime, while the lateral motion of a vehicle has been described in the above, the forward and backward motion and pitching motion of a vehicle may also be applied.

SUMMARY

The present invention has been made in view of the above circumstances, and it is an object of the present invention to provide a vehicle motion control apparatus which is capable of optimally controlling the motion of a vehicle with the selection of a more optimal control object.

According to an illustrative embodiment of the present invention, there is provided a vehicle motion control apparatus configured to control a plurality of control objects in a same direction of vehicle motion control to achieve a requested control amount. The vehicle motion control apparatus comprises a control object selection unit which is configured to determine priority of the control objects used for the vehicle motion control based on a priority determination condition, to select a control object from among the plurality of control objects. The control object selection unit includes a control object selection timing determination section configured to detect a change in the priority determination condition, and to cause the control object selection unit to reselect a control object at a timing of the change detection as a selection timing.

According to the above configuration, the selection timing for a control object is determined based on a priority determination condition. That is, after initial selection of a control object, if the priority determination condition for selecting the control object is changed, the selection of the control object is taken into reconsideration. Accordingly, it becomes possible to smoothly perform a vehicle motion control with the selection of more optimal control object.

BRIEF DESCRIPTION OF THE DRAWINGS

The foregoing and additional features and characteristics of this disclosure will become more apparent from the following detailed description considered with the reference to the accompanying drawings, wherein:

FIGS. 6A and 6B are views showing an example of application request values and selection order for the first to third control objects, wherein FIG. 6A shows a case where the application request mode is the comfort mode, and the FIG. 6B shows a case where the application request mode is the safety mode;

FIG. 7A is a map for selecting a first control object when the application request mode is the comfort mode;

FIG. 7B is a map for selecting a second control object when the application request mode is the comfort mode;

FIG. 7C is a map for selecting a third control object when the application request mode is the comfort mode;

FIG. 8A is a map for selecting a first control object when the application request mode is the safety mode;

FIG. 8B is a map for selecting a second control object when the application request mode is the safety mode;

FIG. 8C is a map for selecting a third control object when the application request mode is the safety mode;

FIG. 14 is a diagram showing the case where the availability of front steering decreases when the lateral motion of a vehicle is being controlled by front steering control, based on an application request.

DETAILED DESCRIPTION

Hereinafter, illustrative embodiments of the present invention will be described with reference to the drawings. Herein, identical or similar parts use the same reference signs throughout the respective illustrative embodiments.

First Illustrative Embodiment

A first illustrative embodiment of the present invention will be described. In the present illustrative embodiment, a vehicle lateral motion control system having a vehicle lateral motion control apparatus (hereinafter referred to as a 'VLP') will be described with reference to the accompanying drawings.

Figure 1:
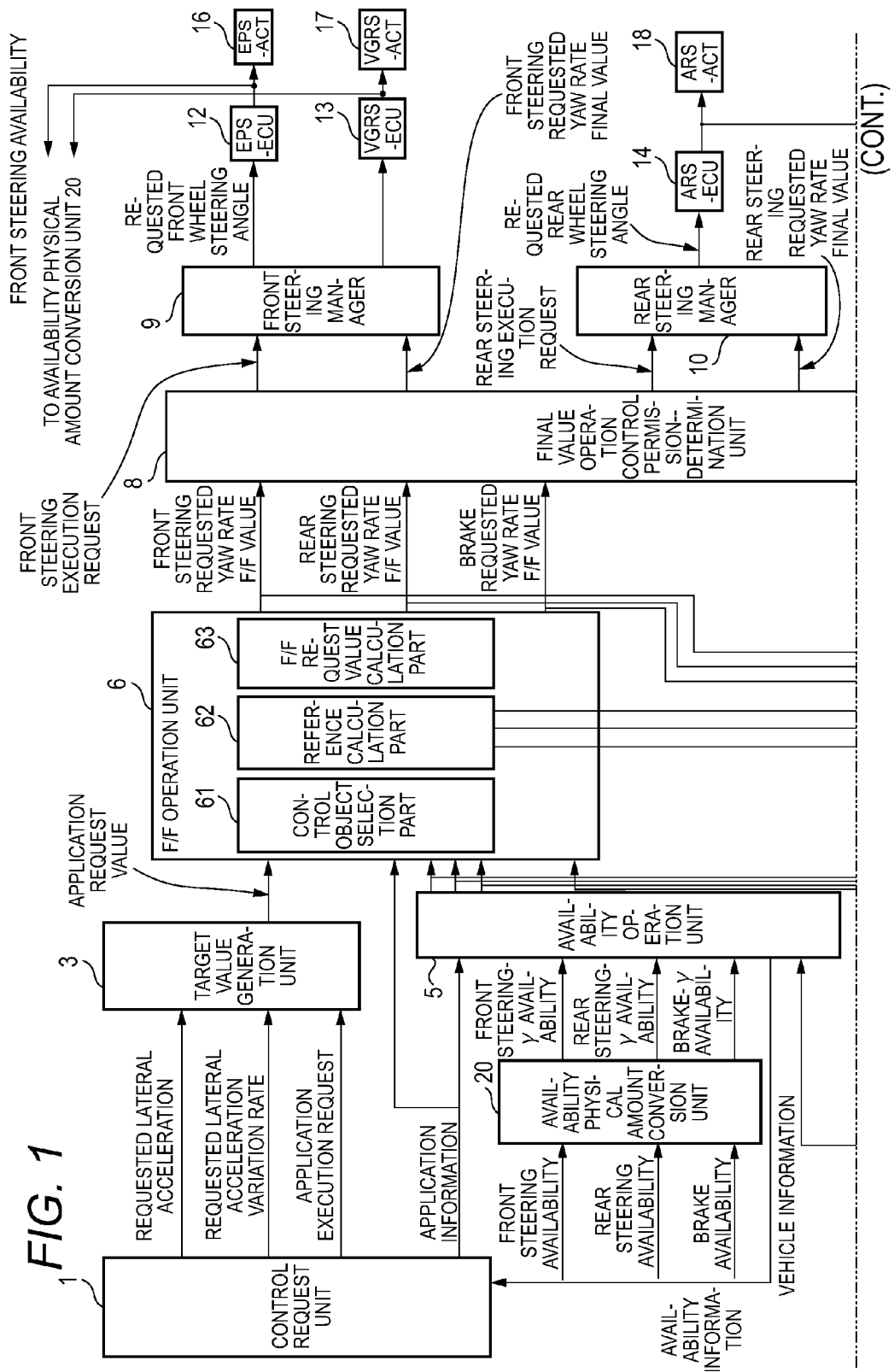
FIG. 1 is a block diagram showing a vehicle lateral motion control system according to a first illustrative embodiment of the present invention.
Figure 1:
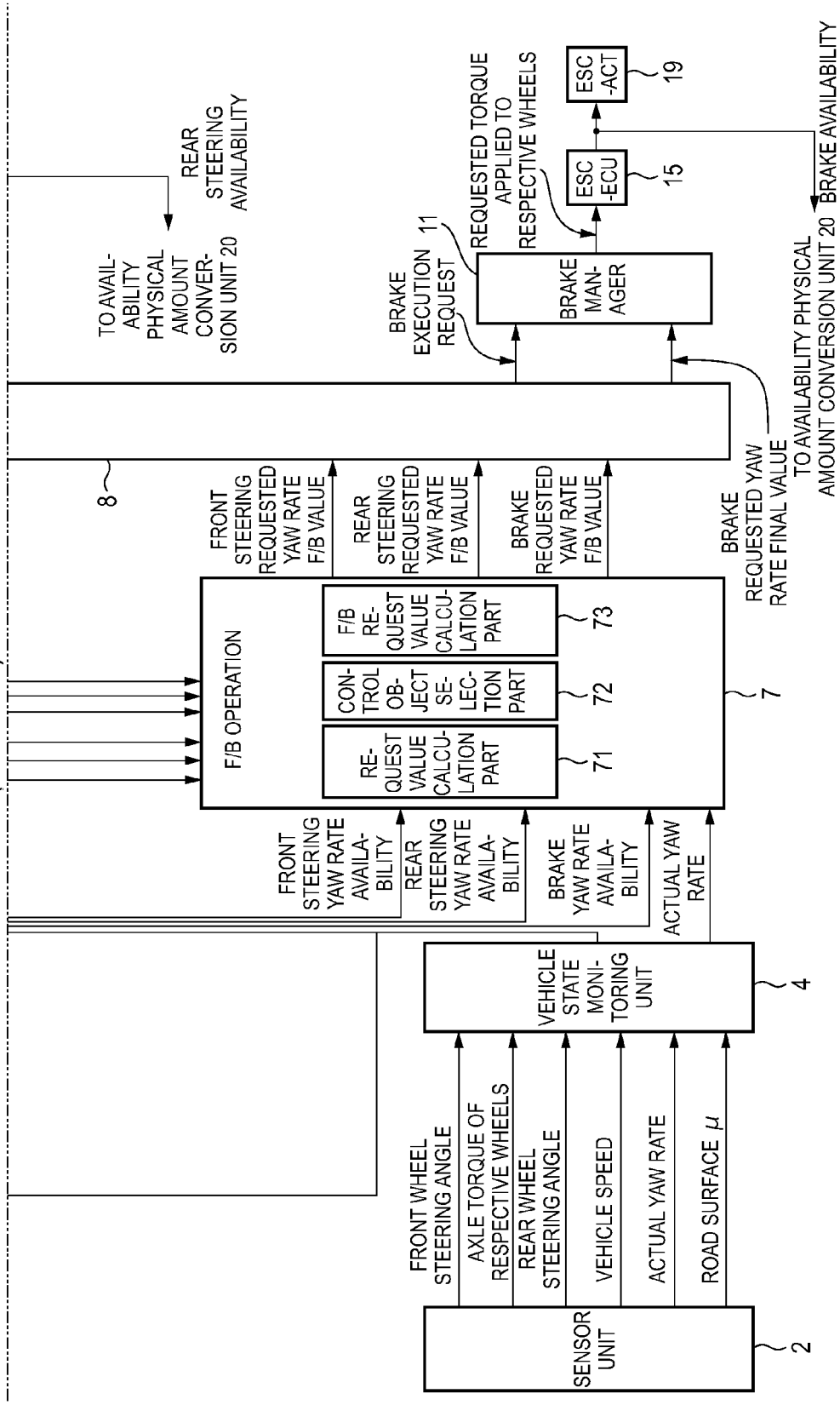

FIG. 1 is a block diagram showing a vehicle lateral motion control system according to the illustrative embodiment of the present invention. The vehicle lateral motion control system controls the lateral motion of a vehicle by controlling a plurality of objects to be controlled (hereinafter referred to as a 'control object'), particularly front steering, rear steering, and a brake.

As shown in FIG. 1, the vehicle lateral motion control system includes a control request unit 1, a sensor unit 2, a target value generation unit 3, a vehicle state monitoring unit 4, an availability operation unit 5, a feed forward (hereinafter referred to as 'F/F') operation unit 6, a feedback (hereinafter referred to as 'F/B') operation unit 7, a final value operation control permission determination unit 8, a variety of managers 9 to 11, a variety of electronic control units (hereinafter referred to as an 'ECU') 12 to 15, and a variety of actuators (hereinafter referred to as an 'ACTS') 16 to 19 for controlling the lateral motion of a vehicle. Here, the target value generation unit 3, the vehicle state monitoring unit 4, the availability operation unit 5, the F/F operation unit 6, the F/B operation unit 7, and the final value operation control permission determination unit 8, or those including the variety of managers 9 to 11 configure the VLP.

The control request unit 1 outputs a request signal for the lateral motion of a vehicle according to a vehicle state based on control requests from respective applications. In the present illustrative embodiment, the control request unit 1 includes a variety of controllers (not shown) to perform a variety of applications such as lane-keep control, lane-departure control, or the like. The lane-keep control is performed to control the lateral motion of a vehicle such that a vehicle does not move out of the center of its running lane when it is running along the lane by perceiving opposite lane-dividing lines of its lane with capture of a road image in front of the running vehicle. The lane-departure control is performed to alarm a driver when the vehicle begins to move out of its lane such that the vehicle does not move out of its lane when it is running along the lane by perceiving opposite lane-dividing lines of its lane with capture of a road image in front of the running vehicle. In addition, the lane-departure control concurrently controls the lateral motion of the vehicle such that the vehicle does not leave its lane. Further, as applications, there may be emergency evasion control that controls the lateral motion of a vehicle in order to avoid a collision with obstacles existing in the direction in which the vehicle is running, parking assist control that controls the lateral motion of a vehicle in order to guide the vehicle along a parking path defined when the vehicle is being parked, or the like. Beside, other applications may be possible so long as they can control the lateral motion of a vehicle.

If it is determined that the respective applications meet a condition to start executing the control of the lateral motion of a vehicle, a request signal is output to indicate either the amount of control required to control the lateral motion of a vehicle or execution of an application, and is input to an apparatus for controlling the lateral motion of a vehicle. Then, a variety of ACTs 16 to 19 used to control the lateral motion of a vehicle are driven so as to control the lateral motion of a vehicle according to the requests from the respective applications. In the present illustrative embodiment, the control request unit 1 uses requested lateral acceleration Gy and requested variation rate of the lateral acceleration dGy/dt as a request signal. In addition, the control request unit also uses an application execution request as a request signal to indicate whether to execute an application.

In addition, the control request unit 1 transmits application information, which is related to request modes to correspond to the content of the respective applications or priority of control objects, to the availability operation unit 5. The request mode corresponding to the content of an application indicates which aspect should be considered with priority among safety, comfort (comfortableness), and eco (economic efficiency), so that it becomes an index to select corresponding control over the content of an application. For example, if the request mode is the safety mode, well-responsive control is performed; if the request mode is the comfort mode, less-responsive control by which a passenger is not subjected to excessive load is performed; and if the request mode is the eco mode, the most energy-efficient control is performed, thereby the control being performed to correspond to the content of an application. In addition, the priority of control objects indicates the priority of control objects that should be selected when the lateral motion of a vehicle is controlled to correspond to the content of an application.

The sensor unit 2 serves to input information related to a variety of vehicle states to the vehicle state monitoring unit 4. Specifically, the sensor unit 2 inputs a variety of vehicle state information, such as detection signals related to a variety of vehicle states, data signals indicative of operation results related to a variety of vehicle states, or the like, to the vehicle state monitoring unit 4. In the present illustrative embodiment, information on a front wheel steering angle, axle torque of respective wheels, a rear wheel steering angle, and a vehicle speed (the speed of a vehicle body) is transmitted from the sensor unit 2 to the vehicle state monitoring unit 4. With regard to the front wheel steering angle or the rear wheel steering angle, e.g. a detection signal obtained by a steering angle sensor is used. With regard to the axle torque of respective wheels, for example, since a brake ECU is operating currently available axle torque of respective wheels, the resultant operation results are used. With regard to the vehicle speed, for example, a value calculated from speeds of respective wheels that are calculated based on detection signals from a wheel speed sensor is used.

In addition, the sensor unit 2 includes a yaw rate sensor that detects an actual yaw rate actually occurring on a vehicle. A detection signal from the yaw rate sensor, or the actual yaw rate calculated based on the detection signal is transmitted to the F/B operation unit 7 via the vehicle state monitoring unit 4. Further, the sensor unit 2 also includes an element to detect road friction coefficient (hereinafter designated as 'μ') that indicates the state of a road along which a vehicle runs. For example, since the brake ECU detects 'μ' based on the wheel speed or the like, the detection result is transmitted to the vehicle state monitoring unit 4.

The target value generation unit 3 regulates the requests from respective applications based on the requested lateral acceleration Gy and the requested variation rate of the lateral acceleration dGy/dt, which are input from the control request unit 1. Further, the target value generation unit outputs an application requested value that is a target control value required to meet a request from respective applications. With respect to the application requested value, an application requested yaw rate, which is an absolute value of yaw rate γ in a control cycle (hereinafter referred to as a 'yaw rate absolute value'), and an application requested variation, which is a variation dγ/dt of the yaw rate, both of which vary according to the content of an application, are output as the application requested value. The request from respective applications is regulated according to the types of applications which are indicated by application execution requests. For example, if the yaw rate γ or the variation dγ/dt of the yaw rate, which corresponds to a total of the requested lateral acceleration Gy or the requested variation of the lateral acceleration dGy/dt, which is requested by applications, is output as the application requested yaw rate or an application requested variation, the control of the lateral motion of a vehicle satisfying the requests from all applications can be performed. If there is priority in the applications, the yaw rate γ or the variation dγ/dt of the yaw rate, which corresponds to the requested lateral acceleration Gy or the requested variation rate of the lateral acceleration dGy/dt, which is requested by high priority application, is output as the application requested yaw rate or an application requested variation. Since which application should be executed is based on the application execution requests, high priority application to be executed can be selected based on the application execution requests.

In the meantime, while it has been described that the present illustrative embodiment uses a calculated yaw rate value, such as the application requested yaw rate or an application requested variation, as a control amount or its variation when performing the control of the lateral motion of a vehicle and uses the requested lateral acceleration Gy or the requested variation rate dGy/dt of lateral acceleration as a requested value input from the control request unit 1, the present invention is not limited thereto. For example, the yaw rate γ and its variation rate dγ/dt may be used as a requested value input from the control request unit 1, and a calculated lateral acceleration value may be used as a control amount when performing the control of the lateral motion of a vehicle.

The vehicle state monitoring unit 4 obtains information on current vehicle states, based on information indicative of a variety of vehicle states input from the sensor unit 2, and outputs the vehicle information to the availability operation unit 5. Specifically, the vehicle state monitoring unit 4 obtains, as vehicle information, a front wheel steering angle, axle torque of respective wheels, a rear wheel steering angle, and a vehicle speed, which should be offered at present time and which are theoretically obtained by general equations based on a front wheel steering angle, axle torque of respective wheels, a rear wheel steering angle, and a vehicle speed, which are currently available to a vehicle. In addition, the vehicle state monitoring unit also obtains, as vehicle information, road friction coefficient μ that indicates the state of a road along which a vehicle runs.

The availability operation unit 5 configures an availability acquisition unit which acquires information (availability information) on the availability of respective control objects (front steering, rear steering, and a brake) by receiving the availability of various kinds of ACTs 16 to 19 via the availability physical amount conversion unit 20 from various kinds of ECUs 12 to 15 for driving the ACTs 16 to 19. In addition, the availability operation unit 5 calculates the availability as VLP based on acquired availability information of the respective control objects, vehicle information transmitted from the vehicle state monitoring unit 4, and application information transmitted from the control request unit 1. Further, it transmits the availability information as VLP to the F/F operation unit 6 or the F/B operation unit 7.

Here, the availability means a controllable range and has the concept that includes the variation in the control amount which is indicative of responsiveness to control, in addition to a maximum value of a control amount (maximum control amount) that can be output. In the control of the lateral motion of a vehicle, the availability includes two sorts of availability, i.e. right and left turns of a vehicle.

For example, the availability of various kinds of ACTs 16 to 19 means a maximum control amount of the ACTs 16 to 19, or responsiveness (variation in a control amount) of the ACTs 16 to 19. In addition, the availability of respective control objects means a maximum control amount or responsiveness (variation in a control amount) of front steering, rear steering, and a brake, which is indicated by the availability of the respective ACTs 16 to 19. With regard to the availability of the respective ACTs 16 to 19, a map or the like indicative of the current states of the respective ACTs 16 to 19 is transmitted from various kinds of ECUs 12 to 15 to the availability operation unit 5 via the availability physical amount conversion unit 20. Among the availability of the ACTs 16 to 19, the sum of the availability of the ACTs 16 and 17 for controlling the front steering becomes the availability of the front steering (front steering availability). In addition, the availability of the ACT 18 for controlling the rear steering becomes the availability of the rear steering (rear steering availability). Similarly, the availability of the ACT 19 for controlling the brake becomes the availability of the brake (brake availability). Because of this, what the availability of various kinds of ACTs 16 to 19 is transmitted from various kinds of ECUs 12 to 15 means that the availability of the respective control objects is transmitted. Thus, in FIG. 1, it is shown that the front steering availability, the rear steering availability, and the brake availability are input from various kinds of ECUs 12 to 15 to the availability operation unit 5 via the availability physical amount conversion unit 20.

In addition, the availability as VLP means a controllable range over which information can be output while taking account the availability or application information of the respective control objects, and vehicle information. The operation of the availability as VLP which is performed by the availability operation unit 5 will be described later in detail.

The F/F operation unit 6 calculates a requested F/F value for F/F control based on the application requested yaw rate or availability information transmitted from the availability operation unit 5, and application information. Specifically, the F/F operation unit 6 includes a control object selection part 61, a reference calculation part 62, and an F/F request calculation part 63.

The control object selection part 61 configures a control object selection unit for selecting a control object based on the application information or availability information, which is transmitted from the availability operation unit 5, in addition to the application requested yaw rate. Specifically, the control object selection part 61 selects a control object that is used to control the lateral motion of a vehicle among the respective control objects, and sets a target value related to a control amount or responsiveness (variation in a control amount) that is requested with regard to the selected control object. The selection of the control object is performed at the timing when the control of the lateral motion of a vehicle is requested, e.g. lane-keep controls or the like is performed. Details of the control object selection part 61 or a method of selecting control objects will be described later.

The reference calculation part 62 calculates a reference value of the selected control object from the availability of the selected control object based on availability information transmitted from the availability operation unit 5 when the control object is selected by the control object selection part 61. That is, when a control object is selected by the control object selection part 61, distribution of a control amount or responsiveness of the selected control object that is required to meet the application requested value is determined. For example, if two control objects are selected by the following method, the distribution is performed such that a maximum control amount of the availability or the maximum variation thereof is applied to the first selected control object, and a control amount that supplies the deficiency of the control performed on the first selected control object is applied to the second selected control object. The control amount or the variation thereof determined herein is a target control value of respective selected control object, i.e. a value that an application requested value is distributed to the respective selected control object. However, it is not a reference value that can be actually obtained. Because of this, the reference calculation part 62 acquires a reference value corresponding to the target control value from previously established data showing the relationship between the target control value and the reference value for respective control objects.

The F/F calculation part 63 calculates an F/F request value for selected control object based on a difference between the target control value of respective selected control object and the reference value calculated by the reference calculation part 62. The calculation method for the F/F request value may use any conventional calculation method known to be used in F/F control. Then, a requested yaw rate F/F value for selected control object is calculated, and the calculated value is output to the final value control permission determination unit 8 and the F/F operation unit 7. As described later, the present illustrative embodiment achieves the requested yaw rate based on the front steering control, the rear steering control, and the brake control. The F/F request value of the yaw rate $\gamma$ achieved by the front steering control or the rear steering control, and the brake control is indicated as a front steering requested yaw rate F/F value, a rear steering requested yaw rate F/F value, and a brake requested yaw rate F/F value, respectively.

The F/B operation unit 7 calculates an F/B value for performing F/B control based on a reference value for respective control objects which is calculated by the F/F operation unit 6, availability information and application information transmitted from the availability operation unit 5, and the actual yaw rate. Specifically, the F/B operation unit 7 of the present illustrative embodiment includes a request value calculation part 71, a control object selection part 72, and an F/B request value calculation part 73.

The request value calculation part 71 calculates a total F/B request value based on a difference between the sum of the reference values of the selected control objects, acquired by the reference calculation part 62 of the F/F operation unit 6, and actual yaw rate detected by the yaw rate sensor included in the sensor unit 2.

The control object selection part 72 configures a control object selection unit for selecting a control object based on the F/B request value, the application information or availability information, which is transmitted via the availability operation unit 5, and respective F/B request values (requested yaw rate F/F values) transmitted from the F/F operation unit 6. Specifically, the control object selection part 72 selects a control object that is used to perform the F/B control among the respective control objects, and sets a target control value related to a control amount or responsiveness (variation in a control amount) that is requested with regard to the selected control object. The function of the control object selection part 72 is basically the same as the function of the control object selection part 61 of the F/F operation unit 6. The control object selected by the control object selection part 72 may be the same or different as or from the control object selected by the control object selection part 61.

The F/B request value calculation part 73 calculates the F/B request value based on a difference between the sum of the reference values of the selected control objects acquired by the reference calculation part 62 of the F/F operation unit 6 and actual yaw rate detected by the yaw rate sensor included in the sensor unit 2, and distributes the F/B request value based on the control object selected by the control object selection part 72 and its control object surplus amount. The calculation method for the F/B request value may use any conventional calculation method known to be used in F/B control. Then, a requested yaw rate F/B value for selected control object is calculated, and the calculated value is output to the final value operation control permission determination unit 8. Herein, the F/B value of the yaw rate $\gamma$ acquired by a front wheel steering angle, a rear wheel steering angle, and the brake control is indicated as a front steering requested yaw rate F/B value, a rear steering requested yaw rate F/B value, and a brake requested yaw rate F/B value, respectively.

The final value operation control permission determination unit 8 calculates a requested yaw rate final value and also determines a control object to be permitted to control, based on the F/F request value (requested yaw rate F/F value) transmitted from the F/F operation unit 6, and the F/B request value (requested yaw rate F/B value) transmitted from the F/B operation unit 7. Thus, a control object is determined among three objects including front steering, rear steering, and a brake. For example, the acquisition of a requested yaw rate F/F value or a requested yaw rate F/B value may become a condition to determine the permission of the control. Further, the final value operation control permission determination unit 8 outputs an execution request and a requested yaw rate final value to a control object that satisfies the determination condition for control.

The execution request is a command that instructs executing a control with respect to an object determined to be permitted to control. For example, if the control object is front steering, rear steering, or a brake, respectively, an execution request for front steering, rear steering, or the brake, respectively, is generated. The requested yaw rate final value is a yaw rate value that is finally requested by the respective control objects such that it is generated. This value is acquired by adding the requested yaw rate F/F values and the requested yaw rate F/B values for respective control objects. That is, a front steering requested yaw rate final value is acquired by adding a front steering requested yaw rate F/F value and a front steering requested yaw rate F/B value. In addition, a rear steering requested yaw rate final value is acquired by adding a rear steering requested yaw rate F/F value and a rear steering requested yaw rate F/B value. In addition, a brake requested yaw rate final value is acquired by adding a brake requested yaw rate F/F value and a brake requested yaw rate F/B value. Further, the respective requested yaw rate final values that are acquired as such are transmitted to various kinds of managers 9 to 11.

The managers 9 to 11 converts the yaw rate final values into a requested control amount (requested physical amount) that should be achieved by respective ACTs 16 to 19, based on the execution requests and requested yaw rate final values transmitted from the final value operation control permission determination unit 8, and transmits the converted values to respective ECUs 12 to 14. Specifically, when the control for the lateral motion of a vehicle is performed with respect to the front steering, a requested front wheel steering angle that corresponds to the front steering requested yaw rate final value is calculated, and the calculated value is transmitted to the ECUs 12 and 13. In addition, when the control for the lateral motion of a vehicle is performed with respect to the rear steering, a requested rear wheel steering angle that corresponds to the rear steering requested yaw rate final value is calculated, and the calculated value is transmitted to the ECU 14. In addition, when the control for the lateral motion of a vehicle is performed with respect to a brake, requested torque added to respective wheels that corresponds to the brake requested yaw rate final value is calculated, and the calculated value is transmitted to the ECU 15.

Here, if the same control object is controlled by driving other ACT, the managers 9 to 11 adjusts which ACT is driven, how a control amount is distributed, or the like, and transmits the adjusted control amount to respective ECUs 12 to 15. For example, in the present illustrative embodiment, since the front steering is controlled by an EPS 16 or a variable gear ratio steering system (hereinafter referred to as 'VGRS') 17 as will be described later, the front steering is controlled by either one or both of the EPS and the VGRS. In this case, a requested front wheel steering angle obtained after adjustment by the manager 9 is transmitted to the respective ECUs 12 and 13.

Various kinds of ECUs 12 to 15 serve to generate control output to control the respective control objects, and control various kinds of ACTs 16 to 19 in order to achieve a requested control amount transmitted from the managers 9 to 11. The ACTs 16 to 19 includes an EPS-ACT 16, a VGRS-ACT 17, an active rear steering (hereinafter referred as 'ARS')-ACT 18, and an anti-side slip control (hereinafter referred to as 'electronic stability control (ESC)')-ACT 19. With control of the ACTs 16 to 19 using the ECUs 12 to 15, the EPS-ACT 16 and the VGRS-ACT 17 perform the front steering control to achieve a requested front wheel steering angle, the ARS-ACT 18 performs the rear steering control to achieve a requested rear wheel steering angle, and the ESC-ACT 19 performs the brake control to achieve requested torque added to respective wheels.

In addition, since the ECUs 12 to 15 monitor the availability of the ACTs 16 to 19, they also transmit it to the availability operation unit 5. The availability may include front steering availability that is a controllable range of the front steering (front wheel steering angle) controlled by the EPS-ACT 16 and the VGRS-ACT 17, rear steering availability that is a controllable range of the rear steering (rear wheel steering angle) controlled by the ARS-ACT 18, and brake availability that is a controllable range of a brake (torque added to respective wheels) controlled by the ESC-ACT 19. In the front steering availability, a front wheel steering angular velocity (variation in a front wheel steering angle) indicative of responsiveness of the front wheel steering angle is included in addition to an absolute value of the front wheel steering angle. In the rear steering availability, a rear wheel steering angular velocity (variation in a rear wheel steering angle) indicative of responsiveness of the rear wheel steering angle is included in addition to an absolute value of the rear wheel steering angle. In the brake availability, a variation in the axle torque applied to respective wheels indicative of responsiveness of the brake is included in addition to an absolute value of the axle torque applied to respective wheels.

According to the above-mentioned configuration, if a request signal is input from the control request unit 1, the availability of the ACTs 16 to 19 or the availability according to vehicle states is calculated. Further, with the ACTs 16 to 19 being controlling based on the availability, more optimal control for the lateral motion of a vehicle is performed.

Subsequently, the availability physical amount conversion unit 20, the availability operation unit 5, and the control object selection part 61 or 72 will be described in detail.

Figure 2:
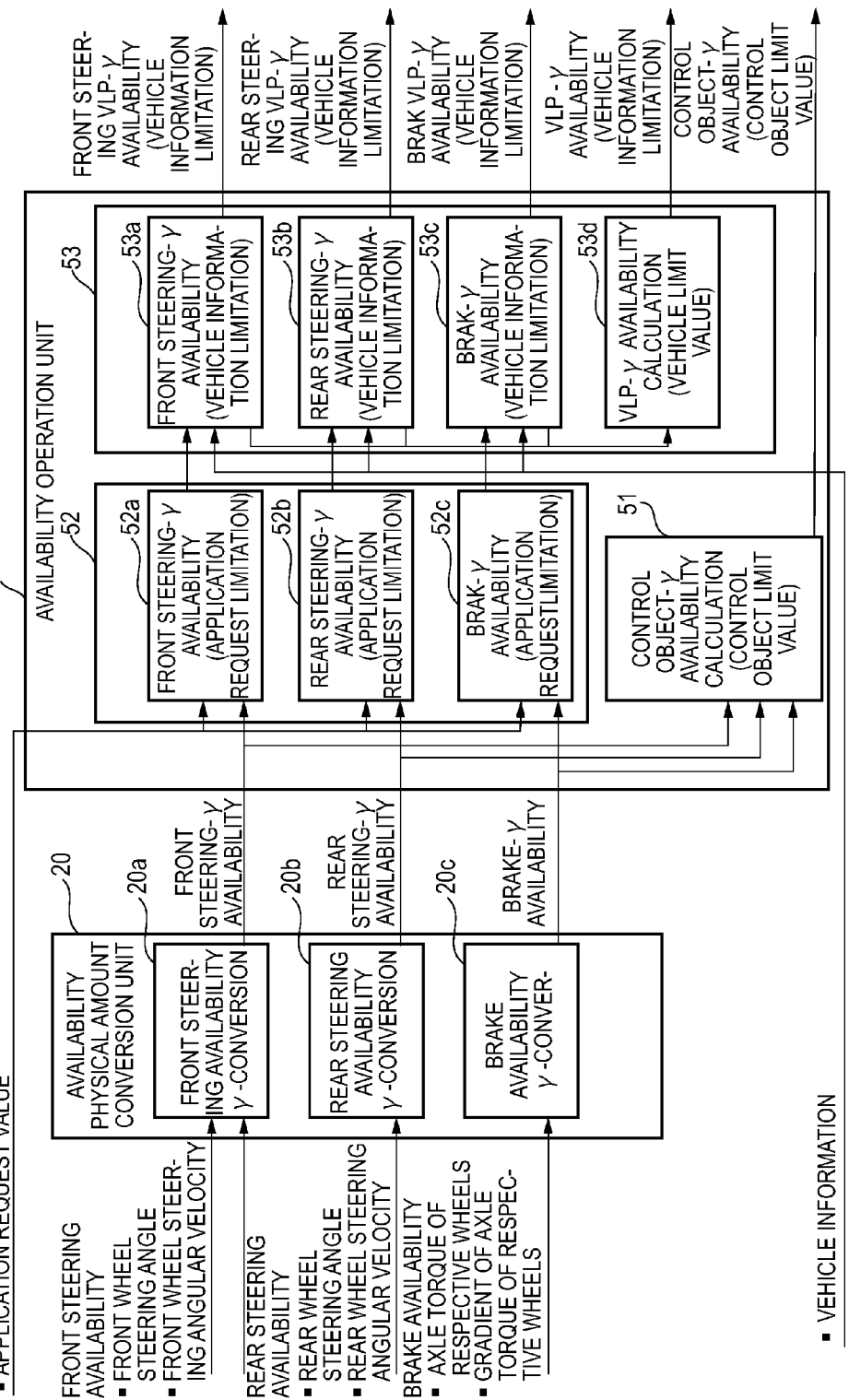
FIG. 2 is a block diagram showing the detailed configuration of an availability physical amount conversion unit 20 and an availability operation unit 5.

FIG. 2 is a block diagram showing the detailed configuration of the availability physical amount conversion unit 20 and the availability operation unit 5. As shown in FIG. 2, the availability operation unit 5 includes a control object γ availability calculation part 51, an application request limitation part 52, and a vehicle information limitation part 53.

The availability physical amount conversion unit 20 serves to calculate the availability as a limitation that respective control objects can generate, by converting the availability transmitted from the ECUs 12 to 15 to the yaw rate.

The availability physical amount conversion unit 20 includes a front availability γ conversion part 20a, a rear availability γ conversion part 20b, and a brake availability γ conversion part 20c.

The front availability γ conversion part 20a calculates front steering-γ availability that is obtained by converting the front steering availability to the yaw rate. The rear availability γ conversion part 20b calculates rear steering-γ availability that is obtained by converting the rear steering availability to the yaw rate. The brake availability γ conversion part 20c calculates brake-γ availability that is obtained by converting the brake availability to the yaw rate. For example, since for the front steering availability, a control amount and its variation are respectively indicated by a front wheel steering angle and a front wheel steering angular velocity, if they are converted to an absolute value of the yaw rate or the variation of the yaw rate dγ/dt, the front steering-γ availability is acquired. This is the same as for the rear steering availability or brake availability, so that if a rear wheel steering angle or its angular velocity, or axle torque applied to respective wheels or its gradient is converted to an absolute value of the yaw rate or the variation of the yaw rate dγ/dt, the rear steering-γ availability or the brake-γ availability is acquired.

The control object γ availability calculation part 51 of the availability operation unit 5 calculate the control object γ availability that is a yaw rate-converted value of the total availability (a limit value of a control object) of respective control objects, by acquiring the sum of the front steering-γ availability, the rear steering-γ availability, and the brake-γ availability, which are calculated by the respective conversion parts 20a to 20c of the availability physical amount conversion unit 20.

The application request limitation part 52 performs an application request limitation that is a limitation according to a request from an application, based on a request mode or priority for control objects which is included in application information. For example, if an application requests that a brake should be not used, a limitation such as setting the brake-γ availability to 0 is performed. Specifically, the application request limitation part 52 includes a front steering application request limitation part 52a, a rear steering application request limitation part 52b, and a brake application request limitation part 52c. When the application request limitation is performed on respective control objects-γ availability, which is calculated by the availability physical amount conversion unit 20, by the respective application request limitation parts 52a to 52c, values applied with application request limitations are set with respect to the front steering-γ availability, the rear steering-γ availability, and the brake-γ availability.

The vehicle information limitation part 53 performs a vehicle information limitation that is a limitation related to vehicle information, based on vehicle operation information included in vehicle information. For example, if a running road is a low friction (μ) road, it is preferred to avoid using a brake in order to prevent a vehicle slip. Because of this, if e.g. road friction (μ) is lower than a threshold value, the road state is determined to be a low friction (μ) road, so that a limitation such as setting the brake-γ availability to 0 is performed. Specifically, the vehicle information limitation part 53 includes a front steering vehicle information limitation part 53a, a rear steering vehicle information limitation part 53b, a brake vehicle information limitation part 53c, and a vehicle limitation value calculation part 53d. The respective vehicle information limitation parts 53a to 53c additionally carry out a limitation with respect to γ availability applied with the application request limitation, which is calculated by the respective application request limitation parts 52a to 52c. Accordingly, γ availability of respective control objects which is finally output as VLP, i.e. the front steering VLP-γ availability, the rear steering VLP-γ availability, and the brake VLP-γ availability, can be set.

In addition, the vehicle limitation value calculation part 53d calculates total γ availability that can be finally output as VLP. Specifically, the vehicle limitation value calculation part 53d calculates the total VLP-γ availability (a vehicle limitation value) that can be finally output, by acquiring the sum of the front steering VLP-γ availability, the rear steering VLP-γ availability, and the brake VLP-γ availability, which are calculated by the vehicle information limitation parts 53a to 53c.

Then, the availability operation unit 5 calculates the VLP availability that is corrected by additionally adding an application request or vehicle information to a converted value of the limitation-added availability of respective control objects, which is yaw rate-converted by the availability physical amount conversion unit 20. Here, the limitation-added availability of the respective control objects is generated by the ACTs 16 to 19. Further, the availability operation unit transmits VLP availability related information to the F/F operation unit 6 or the F/B operation unit 7. In the meantime, the application request means an application request that includes an application request value in addition to the application request mode or priority of control objects, which are included in application information.

Figure 3:
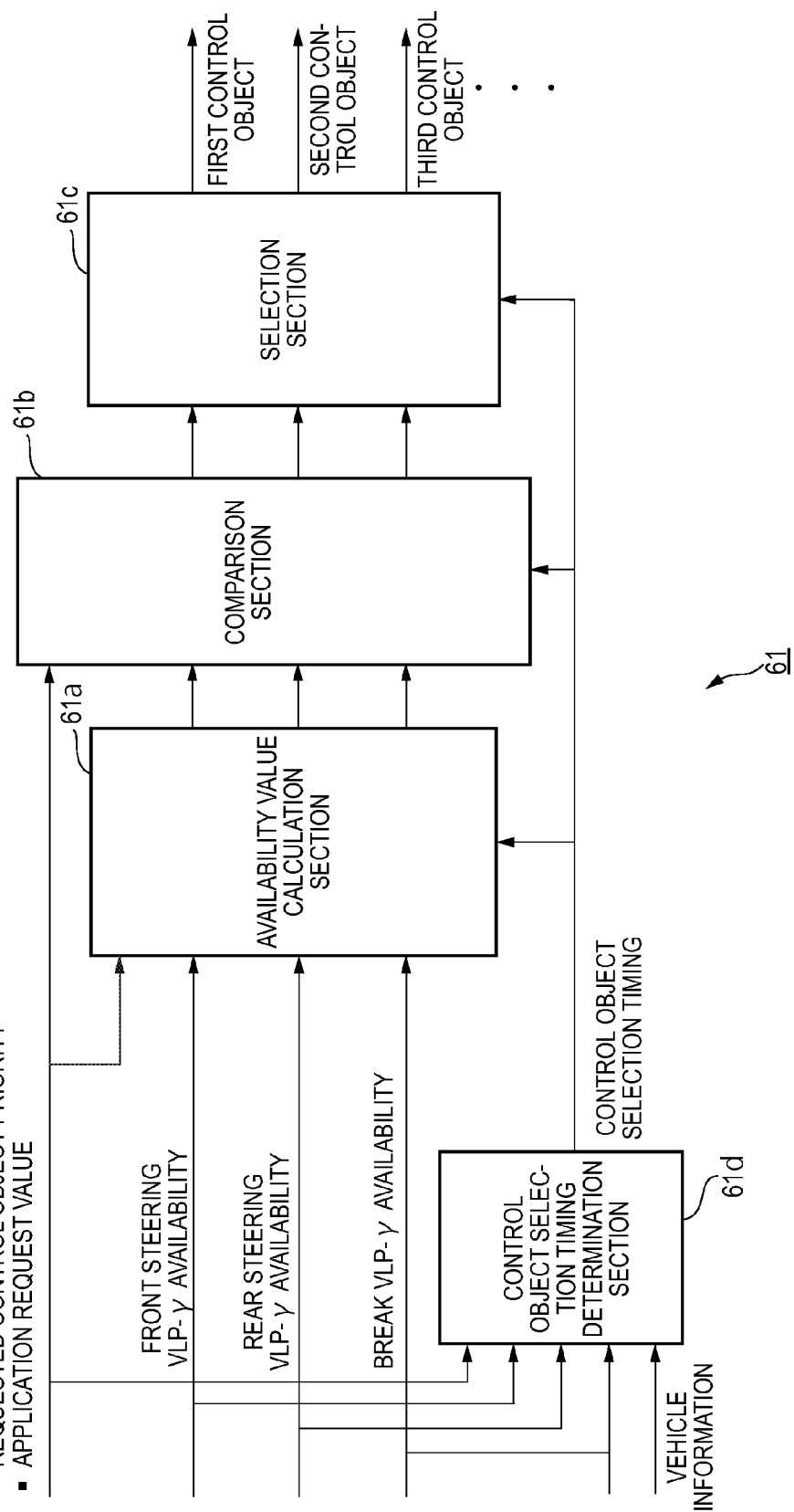
FIG. 3 is a block diagram showing the detailed configuration of a control object selection part 61.

Subsequently, the control object selection part 61 or 72 will be described in detail. FIG. 3 is a block diagram showing the detailed configuration of the control object selection part 61. As shown in FIG. 3, the control object selection part 61 includes an availability value calculation section 61a, a comparison section 61b, a selection section 61c, and a control object selection timing determination section 61d.

The availability value calculation section 61a calculates an absolute value of the yaw rate and its variation dγ/dt, which can be achieved by respective control objects, from the application request value, application information, and respective availability transmitted from the availability operation unit 5, i.e. the front steering VLP-γ availability, the rear steering VLP-γ availability, and the brake VLP-γ availability. Specifically, since the respective availability transmitted from the availability operation unit 5 includes an absolute value of a control amount and its variation, the respective availability is indicated as a map of the absolute value of the yaw rate and its variation dγ/dt. Using this map, the absolute value of the yaw rate and its variation dγ/dt, which correspond to an application request value or application information, are calculated.

Figure 4A:
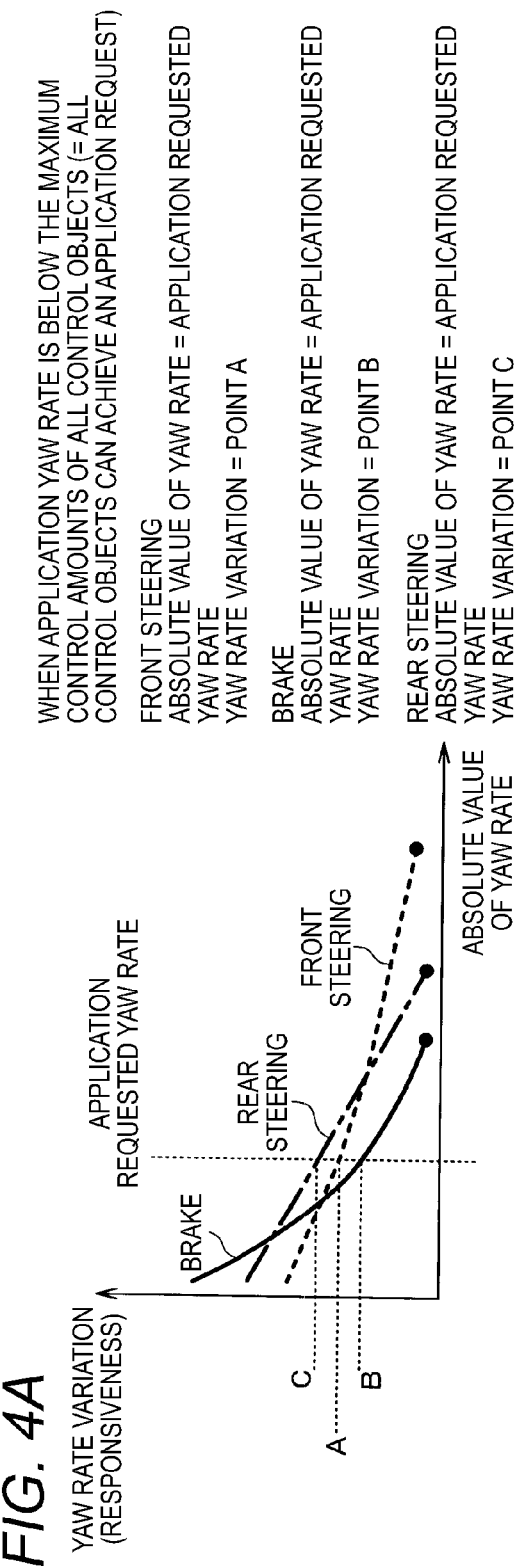
FIGS. 4A and 4B are views showing selection patterns in the cases where an application requested yaw rate can be achieved in all control objects and it can be achieved in only any of the control objects, when an application request mode is a comfort mode.
Figure 4B:
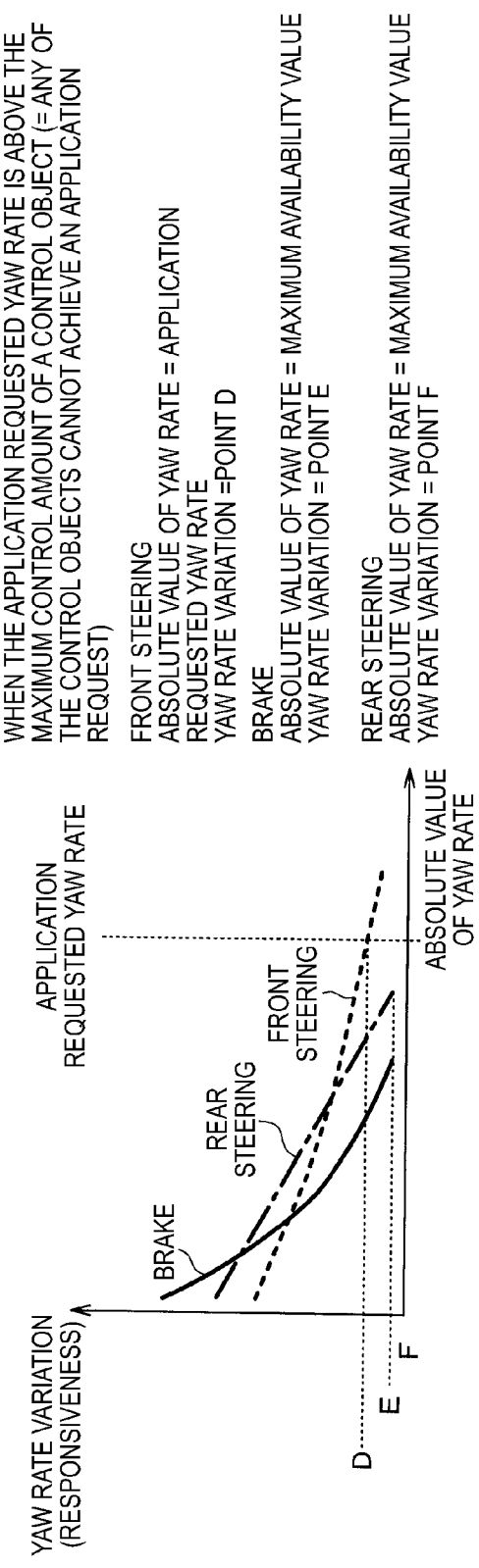
Figure 5A:
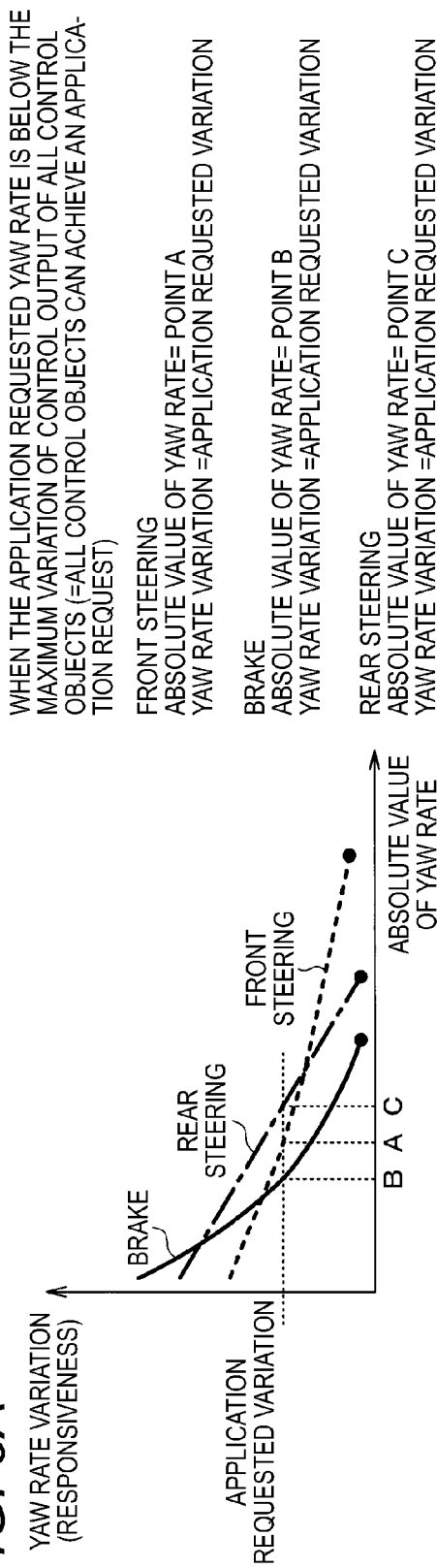
FIGS. 5A and 5B are views showing selection patterns in the cases where an application requested change can be achieved in all control objects and it can be achieved in only any of the control objects, when an application request mode is a safety mode.
Figure 5B:
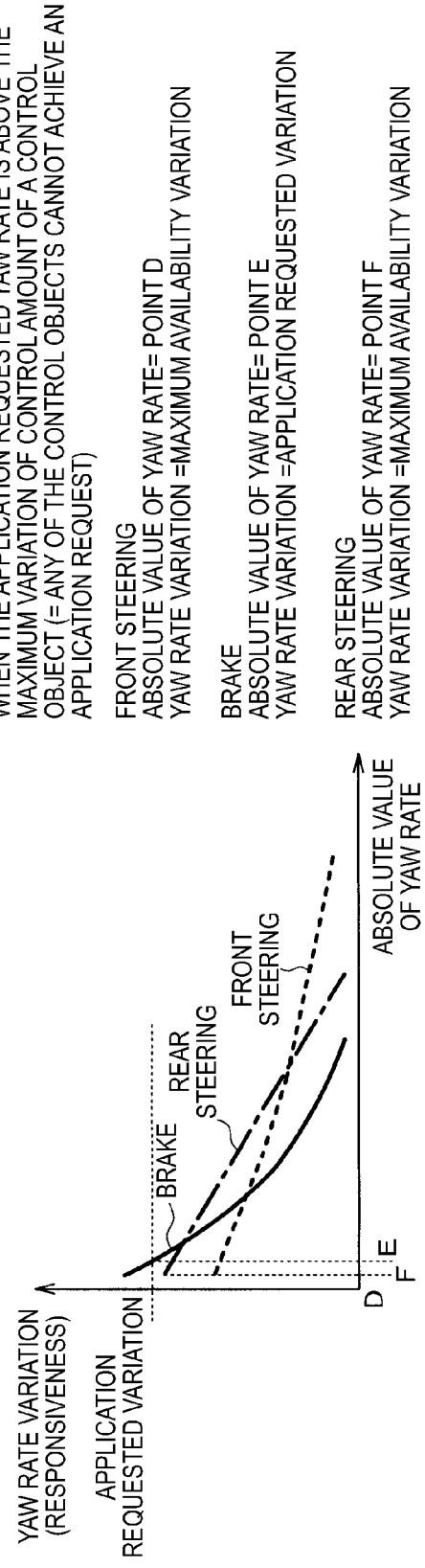

The above-mentioned configuration will be described with reference to FIGS. 4A, 4B, 5A and 5B. FIGS. 4A and 4B are views showing selection patterns in the cases where an application requested yaw rate can be achieved in all control objects and it can be achieved in only any of the control objects, when an application request mode is a comfort mode. FIGS. 5A and 5B are views showing selection patterns in the cases where an application requested variation can be achieved in all control objects and it can be achieved in only any of the control objects, when an application request mode is a safety mode.

For example, assuming that a map related to an absolute value of the yaw rate and its variation dγ/dt of respective control objects is provided as shown in FIGS. 4A, 4B, 5A and 5B, based on respective availability transmitted from the availability operation unit 5.

In this case, when the application request mode is the comfort, it may be preferred that an application request value be achieved such that excessive load is not applied to a passenger at low responsiveness, rather than at high responsiveness, or otherwise it be achieved using less number of ACTs. Because of this, in the case, the absolute value of the yaw rate and its variation dγ/dt are calculated with reference to the application requested yaw rate. In the meantime, if the application request mode is the safety, an emergency feature is required, so that it is preferred that the application request value be achieved with higher responsiveness. Thus, the absolute value of the yaw rate and its variation dγ/dt are calculated with reference to the variation of the application requested yaw rate.

Specifically, if the application requested yaw rate can be achieved with respect to all control objects as shown in FIG. 4A, i.e. if the application requested yaw rate is smaller than the maximum control amounts (maximum availability value) of all the control objects, the absolute values of the yaw rate of the respective control objects all become the application requested yaw rate. Further, the variation of yaw rate dγ/dt becomes a point at which the map of the respective control object intersects the application requested yaw rate. That is, with regard to the front steering, the absolute value of the yaw rate becomes the application requested yaw rate, and the variation of yaw rate dγ/dt becomes a point A. With regard to a brake, the absolute value of the yaw rate becomes the application requested yaw rate, and the variation of yaw rate dγ/dt becomes a point B. With regard to the rear steering, the absolute value of the yaw rate becomes the application requested yaw rate, and the variation of yaw rate dγ/dt becomes a point C.

In the meantime, if the application request mode is the comfort and as shown in FIG. 4B, the application requested yaw rate can be achieved in only any of the control objects, i.e. if the application requested yaw rate is larger than the maximum control amount of any of the control objects, the absolute value of the yaw rate and its variation dγ/dt for respective control objects are as follows. That is, with regard to the front steering in which a maximum control amount for a control object is greater than the application requested yaw rate, the absolute value of the yaw rate becomes the application requested yaw rate, and the variation of yaw rate dγ/dt becomes a point D. With regard to the rear steering and the brake, the absolute value of the yaw rate becomes the maximum control amount, and the variation of yaw rate dγ/dt becomes points E and F (E=F).

In addition, if the application request mode is the safety and as shown in FIG. 5A, the application requested variation can be achieved with respect to all control objects, i.e. if the application requested variation is smaller than the maximum variations of the control amounts (maximum availability variation) of all the control objects, the variations dγ/dt of yaw rate with respect to respective control objects all become the application requested variation. Further, the absolute value of the yaw rate becomes a point at which the map of the respective control object intersects the application requested variation. That is, with regard to the front steering, the variation of yaw rate dγ/dt becomes the application requested variation, and the absolute value of the yaw rate becomes a point A. With regard to a brake, the variation of yaw rate dγ/dt becomes the application requested variation, and the absolute value of the yaw rate becomes a point B. With regard to the rear steering, the variation of yaw rate dγ/dt becomes the application requested variation, and the absolute value of the yaw rate becomes a point C.

In the meantime, if the application request mode is the safety and as shown in FIG. 5B, the application requested variation can be achieved for only any of the control objects, i.e. if the application requested variation is larger than the maximum variation of the control amount of any of the control objects, the absolute value of the yaw rate and its variation dγ/dt for respective control objects are as follows. That is, with regard to the brake in which a maximum variation of the control amount for a control object is greater than the application requested variation, the variation of yaw rate dγ/dt becomes the application requested variation, and the absolute value of the yaw rate becomes a point E. With regard to the front steering and the rear steering, the variation of yaw rate dγ/dt becomes the maximum variation, and the absolute value of the yaw rate becomes points D and F (D=F).

The comparison section 61b compares an application request value, i.e. the application requested yaw rate or application requested variation, with an absolute value of the yaw rate or its variation dγ/dt, which can be achieved for respective control objects by the availability value calculation section 61a. For example, the absolute value of the yaw rate or its variation dγ/dt for respective control objects is compared with the application request value, i.e. they are compared to check whether the application request value can be achieved by respective control objects or not, so that it is determined for which control object the application request value can be achieved or not. For example, assuming that respective absolute values of the yaw rate for the front steering, the rear steering, and the brake are 8, 6, and 3, respectively. In this case, if the application requested yaw rate as an application request value is 5, the application request value is achieved for the front steering and the rear steering, and is not achieved for the brake. Further, assuming that the application requested variation is 3 and respective absolute values of the yaw rate for the front steering, the rear steering, and the brake are 5, 6, and 7, respectively. In this case, the application requested value is achieved for all of the front steering, the rear steering, and the brake. Such comparison is performed between the application requested yaw rate and the absolute value of the yaw rate, which is calculated by the availability value calculation section 61a, and between the application requested variation and the yaw rate variation, which is calculated by the availability value calculation section 61a, respectively.

The selection section 61c performs selection of a control object by selecting a control object based on a comparison result from the comparison section 61b.

The selection of a control object is performed to select an control object that should be controlled in order to achieve an application request value according to an application request mode. A control object that is selected with highest priority among other control objects becomes a first control object. If an application request value according to an application request mode cannot be achieved with only the first control object, a second control object is selected. Further, if it cannot also be achieved with the second control object, a third control object is selected. Here, the order for selecting the first to third control objects may be changed according to the application request mode.

The selection of a control object will be described with reference to FIGS. 6A and 6B. FIGS. 6A and 6B are views showing an example of application request values and selection order for the first to third control objects, wherein the FIG. 6A shows a case where the application request mode is the comfort mode, and the FIG. 6B shows a case where the application request mode is the safety mode.

As shown in FIGS. 6A and 6B, a reference value is set with respect to the application requested yaw rate, and the selection of a control object is performed in order to satisfy the reference value. If the application request mode is the comfort mode, high responsiveness is not required, so that as shown in FIG. 6A, the first to third control objects are selected in order of the higher absolute value of yaw rate. Accordingly, control objects used to control the lateral motion of a vehicle can be sequentially selected from a control object having a higher absolute value to a control object having a lower absolute value. Therefore, the lateral motion of a vehicle can be controlled by fewer control objects, so that the occurrence of vibrations in the lateral motion of a vehicle, which is due to interference between control objects, can be minimized, resulting in improved comfortableness compared to the case of unnecessarily having more control objects.

In contrast, if the application request mode is the safety mode, high responsiveness is required, so that as shown in FIG. 6B, the first to third control objects are selected in order of the higher yaw rate variation dγ/dt. In this case, the safety is highly regarded rather than the comfortableness, and thus it is possible to control the lateral motion of a vehicle with higher responsiveness. However, it is noted that since despite having high yaw rate variation dγ/dt, if the absolute value of the yaw rate is small, the safety mode cannot cope with the emergency situation. Therefore, for example, if the absolute value of the yaw rate is below a certain ratio of the application requested yaw rate, the order of selection may be lowered.

Exemplary methods of selecting control objects based on this aspect will be described with reference to maps shown in FIGS. 7A to 7C and FIGS. 8A to 8C.

FIGS. 7A to 7C show maps for selecting a control object when the application request mode is the comfort mode. FIGS. 8A to 8C show maps for selecting a control object when the application request mode is the safety mode. FIGS. 7A and 8A show a map for selecting a first control object that is first selected among other control objects. FIGS. 7B and 8B and FIGS. 7C and 8C show maps for selecting second and third control objects that are secondarily and thirdly selected after the first control object is selected.

First, a selection is made with respect to a comparison result on whether to satisfy the application requested yaw rate, using the map of FIG. 7A. For example, referring to the above-mentioned example, an item '5: rear steering and front steering achieve' is selected. Subsequently, a selection is made with respect to a comparison result on whether to satisfy the application requested variation, using the map of FIG. 7A. Referring to the above-mentioned example, an item '7: all achieve' is selected. Then, an item '6: selection of maximum value of front steering and rear steering' is selected, which is placed at a column at which a longitudinal column and a horizontal column of respective item intersect. In this case, either front steering or rear steering that has a maximum absolute value of the yaw rate is selected as the first control object.

Next, a selection is made with respect to a comparison result on whether to satisfy the application requested yaw rate, using the map of FIG. 7B. For example, referring to the above-mentioned example, an item '5: front steering and rear steering achieve' is selected. Subsequently, a selection is made with respect to a comparison result on whether to satisfy the application requested variation, using the map of FIG. 7B. Referring to the above-mentioned example, an item '7: all achieve, *1st is a control object with a maximum variation' is selected. Then, an item 'no 2nd selection' is selected, which is placed at a column at which a longitudinal column and a horizontal column of respective item intersect. In this case, the second control object is not selected.

In addition, a selection is made with respect to a comparison result on whether to satisfy the application requested yaw rate, using the map of FIG. 7C. For example, referring to the above-mentioned example, an item '5: front steering and rear steering achieve' is selected. Subsequently, a selection is made with respect to a comparison result on whether to satisfy the application requested variation, using the map of FIG. 7C. Referring to the above-mentioned example, an item '7: all achieve' is selected. Then, an item 'no 2nd selection' is selected, which is placed at a column at which a longitudinal column and a horizontal column of respective item intersect. In this case, the third control object is also not selected.

Further, while the method of selecting the first to third control objects at the comfort mode have been described above, the method of selecting the first to third control objects at the safety mode are the same as those methods at the comfort mode, except that the method at the safety mode use maps of FIGS. 8A to 8C instead of the maps of FIGS. 7A to 7C.

In the meantime, in the maps shown in FIGS. 7A to 7C, the control objects are basically selected in order of higher absolute value of the yaw rate, and all the control objects are not always selected, but only a required control object is selected. In addition, if both the application requested yaw rate and its variation are all achieved by a single control object, the single control object becomes a control object to be selected. In addition, if the application requested yaw rate is achieved by two or more control objects, a selection is made while taking account the yaw rate requested variation. In addition, if the application requested yaw rate is achieved by all control objects, and the application requested variation is not achieved by all control objects, a control object having a maximum value of not an absolute value of the yaw rate, but the yaw rate variation dγ/dt, is selected, thereby reducing the number of the control objects that should be operated.

In the meantime, in the maps shown in FIGS. 8A to 8C, the control objects are basically selected in order of higher yaw rate variation dγ/dt, and all the control objects are not always selected, but only a required control object is selected. In addition, if both the application requested yaw rate and its variation are all achieved by a single control object, the single control object becomes a control object to be selected. In addition, if the application requested variation is achieved by two or more control objects, a selection is made while taking account the absolute value of the yaw rate. In addition, if the application requested variation is achieved by all control objects, and the application requested yaw rate is not achieved by all control objects, a control object having a maximum value of not the yaw rate variation dγ/dt, but the absolute value of the yaw rate, is selected, thereby reducing the number of the control objects that should be operated.

As such, if a selection of a control object has been completed by the control object selection part 61, the reference calculation part 62 calculates a reference value from the application requested yaw rate and the availability of the selected control object, and the F/F request value calculation part 63 calculates an F/F request value. Based on this, the F/F operation unit 6, the final value operation control permission determination unit 8, and various kinds of managers 9 to 11 perform the above-mentioned operations. Then, requested control amounts are transmitted from the managers 9 to 11 to various kinds of ECUs 12 to 15, and the ECUs 12 to 15 drive respective ACTs 16 to 19. Thus, it is possible to perform the lateral motion of a vehicle according to a request from an application.

The control object selection timing determination section 61*d* determines selection timing of a control object according to the above-mentioned method, based on an application request, vehicle information, and availability of respective control objects calculated by the availability operation unit 5, which are a condition to determine priority of control objects when selected. Specifically, the first selection of a control object is performed at a time when an application request is generated (when a request to control the lateral motion of a vehicle is generated), for example when lane-keep control or lane-departure control is executed. However, the priority of control objects need to be reconsidered according to an application request, vehicle information, or variation in the availability of respective control objects, which are a condition to determine the priority when control objects are selected. Because of this, the control object selection timing determination section 61*d* acquires a calculation result from the availability operation unit 5, together with the application request or vehicle information obtained from the vehicle state monitoring unit 4, and reconsiders selection of control objects based on acquired information, even after the time when a control request for the lateral motion of a vehicle is generated is determined as the timing to select a control object.

Figure 9:
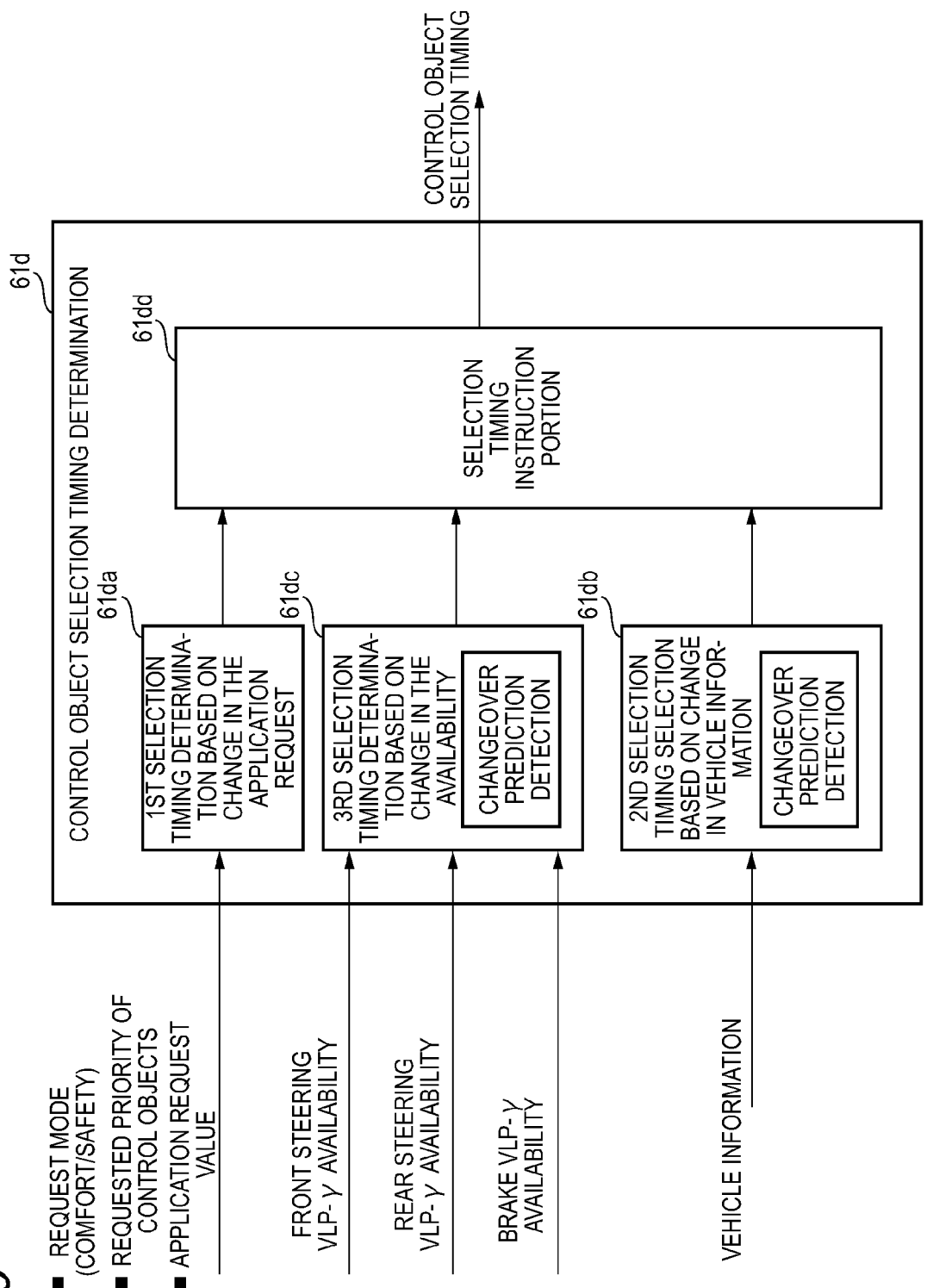
FIG. 9 is a block diagram showing the detailed configuration of a control object selection timing determination section 61d.

FIG. 9 is a block diagram showing the detailed configuration of a control object selection timing determination section 61*d*. As shown in FIG. 9, the control object selection timing determination section 61*d* includes a first selection timing determination portion 61*da* operates based on change in an application request, a second selection timing determination portion 61*db* operates based on change in vehicle information, a third selection timing determination portion 61*dc* operates based on change in the availability, and a selection timing instruction portion 61*dd*.

The first selection timing determination portion 61*da* determines the control object selection timing based on change in the content of an application request mode indicated in application information. The change in the application information may include the change in the application request mode such as change from the comfort mode to the safety mode. With regard to this, a vehicle behavior and a variation in the availability when the application request mode changes from the comfort mode to the safety mode will be described with reference to FIG. 10.

If lane-keep control is performed, the front steering (or rear steering), the maximum availability of which is higher than that of a brake is selected as a control object by the control object selection part 61, because the lane-keep control gives priority to comfortableness. However, if a vehicle is apt to run across a lane dividing line opposite to its running lane, so that the control changes to the lane departure control, the application request mode changes from the comfort mode to the safety mode. Because of this, the control object selection timing determination section 61*d* monitors an application request mode, and if this mode changes, it determines the timing as the selection timing, so that it outputs a signal instructing respective sections of the control object selection part 61 to select a control object. Based on this, the control object selection part 61 repeats the selection of a control object using the above-mentioned method to reconsider the selection of a control object, thereby reselecting a control object according to a changed application mode. Here, the brake with high responsiveness for the availability is selected with priority.

Figure 10:
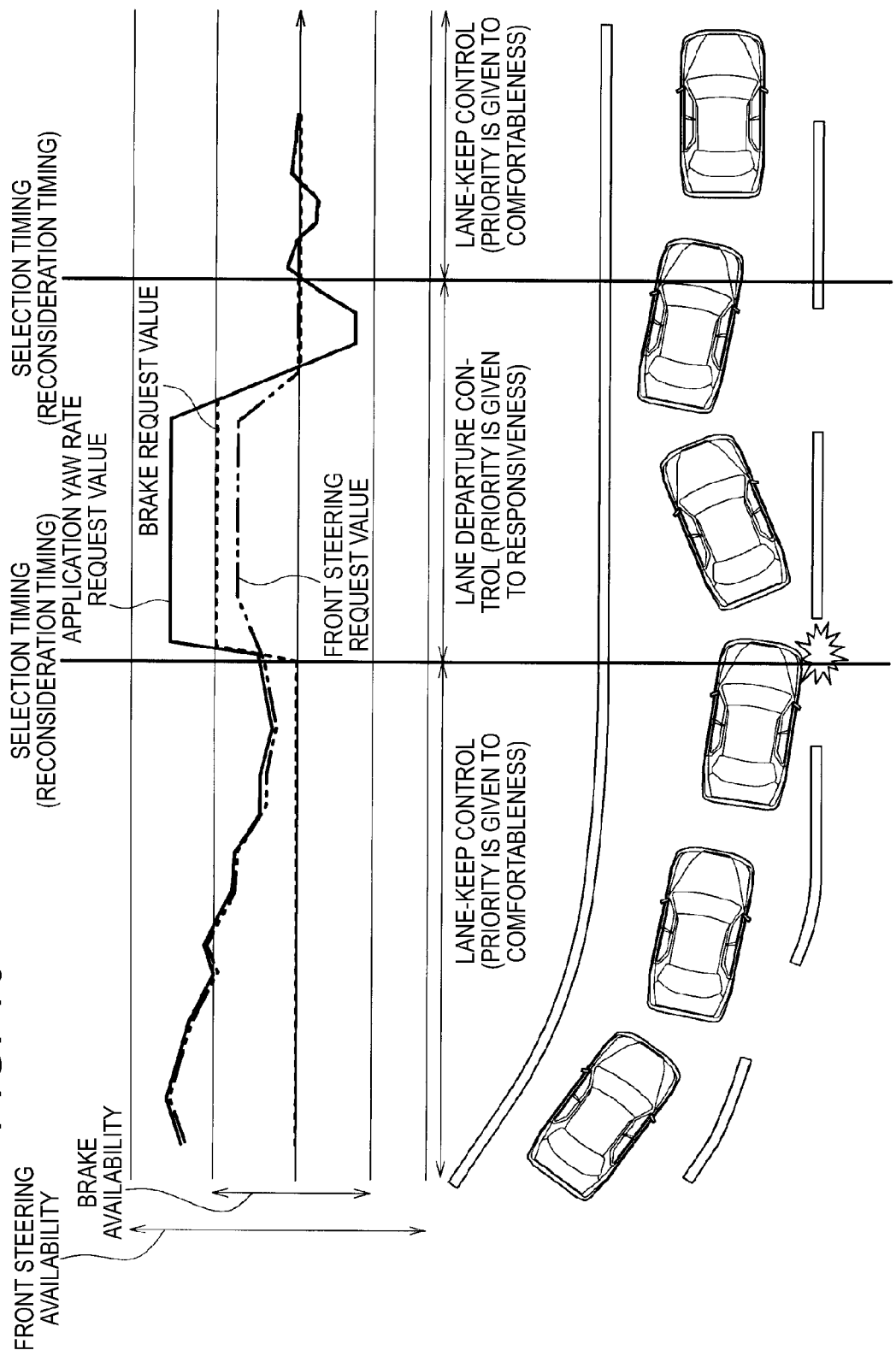
FIG. 10 is a diagram showing a vehicle behavior and a change in the availability when the application request mode changes from the comfort mode to the safety mode.

In addition, as shown in FIG. 10, if the lane-departure control has been completed and the lane-keep control is performed again, a signal is output that instructs reselecting a control object according to the change in the application request mode. Then, the selection of a control object is reconsidered, and a control object that is suitable for the lane-keep control is selected.

That is, if an application request changes, in a case where, for example, the application request mode includes a comfort mode giving priority to the comfortableness, and a safety mode giving priority to responsiveness, the time when the application request mode changed is determined as the selection timing, and the selection of a control object is reconsidered at the selection timing. Thus, it is possible to select a more appropriate control object based on an application request.

Figure 11:
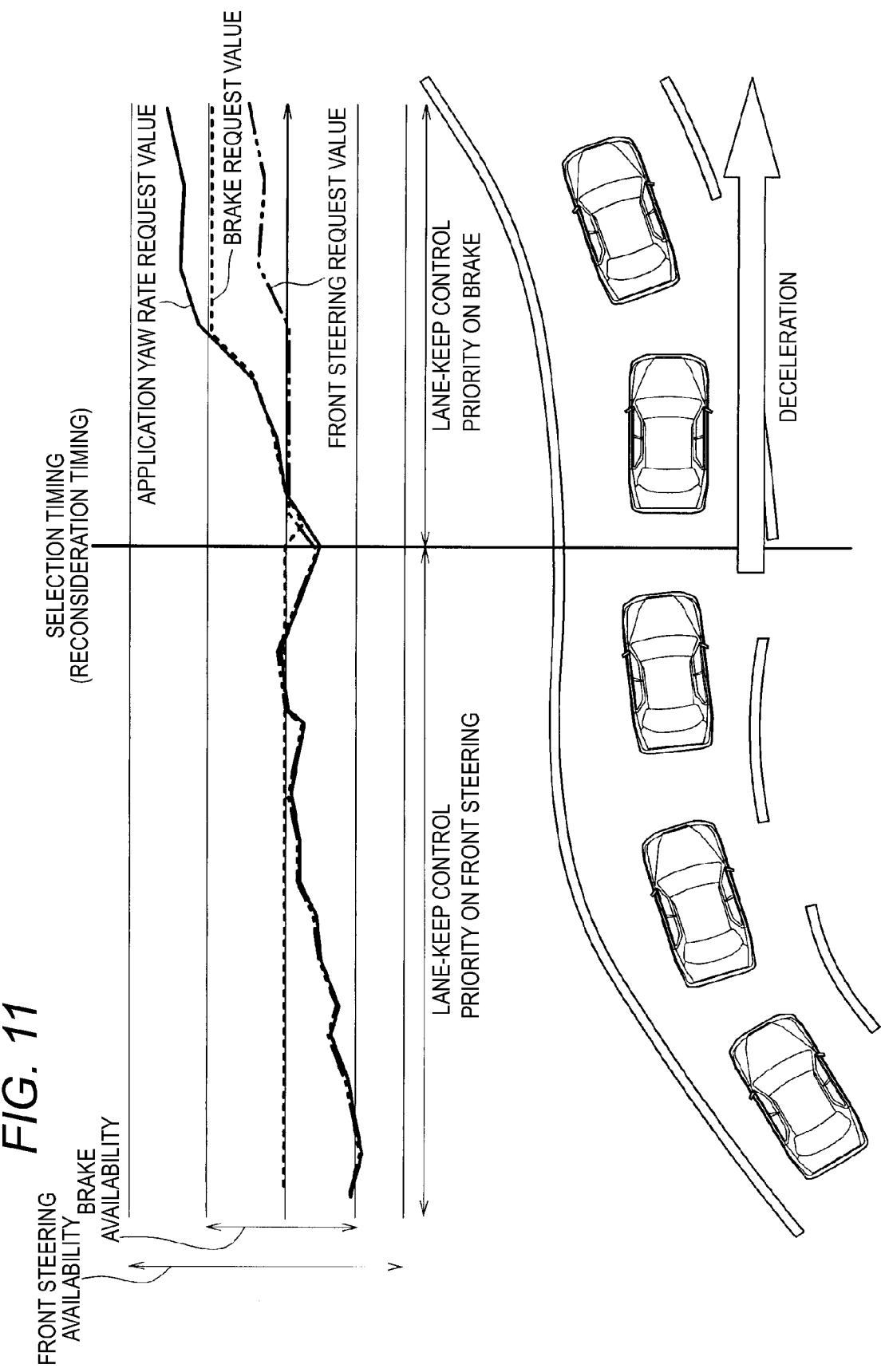
FIG. 11 is a diagram showing a vehicle behavior and a change in the availability when a vehicle reduces the speed in the case where a control object selected during lane-keep control is front steering.

The second selection timing determination portion 61*db* determines selection timing for a control object based on change in vehicle information such as a vehicle state. The change in the vehicle state may include the case where for example, a vehicle reduces the speed. With regard to this, a vehicle behavior and a change in the availability when a vehicle reduces the speed in a case where the front steering is selected as a control object during lane-keep control will be described with reference to FIG. 11.

For example, if a vehicle reduces the speed during lane-keep control, it is advantageous in an aspect of energy loss that a brake is selected with priority as a control object even when its maximum availability is smaller than those of other control objects. That is, if a vehicle should turn the corner while reducing its speed, such as it being turning the corner while running down along a downhill road at overspeed, the brake control should be first selected as a control object, rather than the front steering or rear steering control, because the vehicle is able to turn owing to braking moment, which provides improved reduction and turning performances. Further, since when the vehicle is turning the corner, an energy used in braking is distributed for front steering or rear steering, energy required for turning is reduced, and thus energy loss can be reduced.

That is, for example, in the lane-keep control, the time when a vehicle state changes, such as if a vehicle should turn the corner while reducing its speed, such as it being turning the corner while running down along a downhill road at overspeed, is determined as selection timing, and the selection of a control object is reconsidered at that timing.

Figure 12:
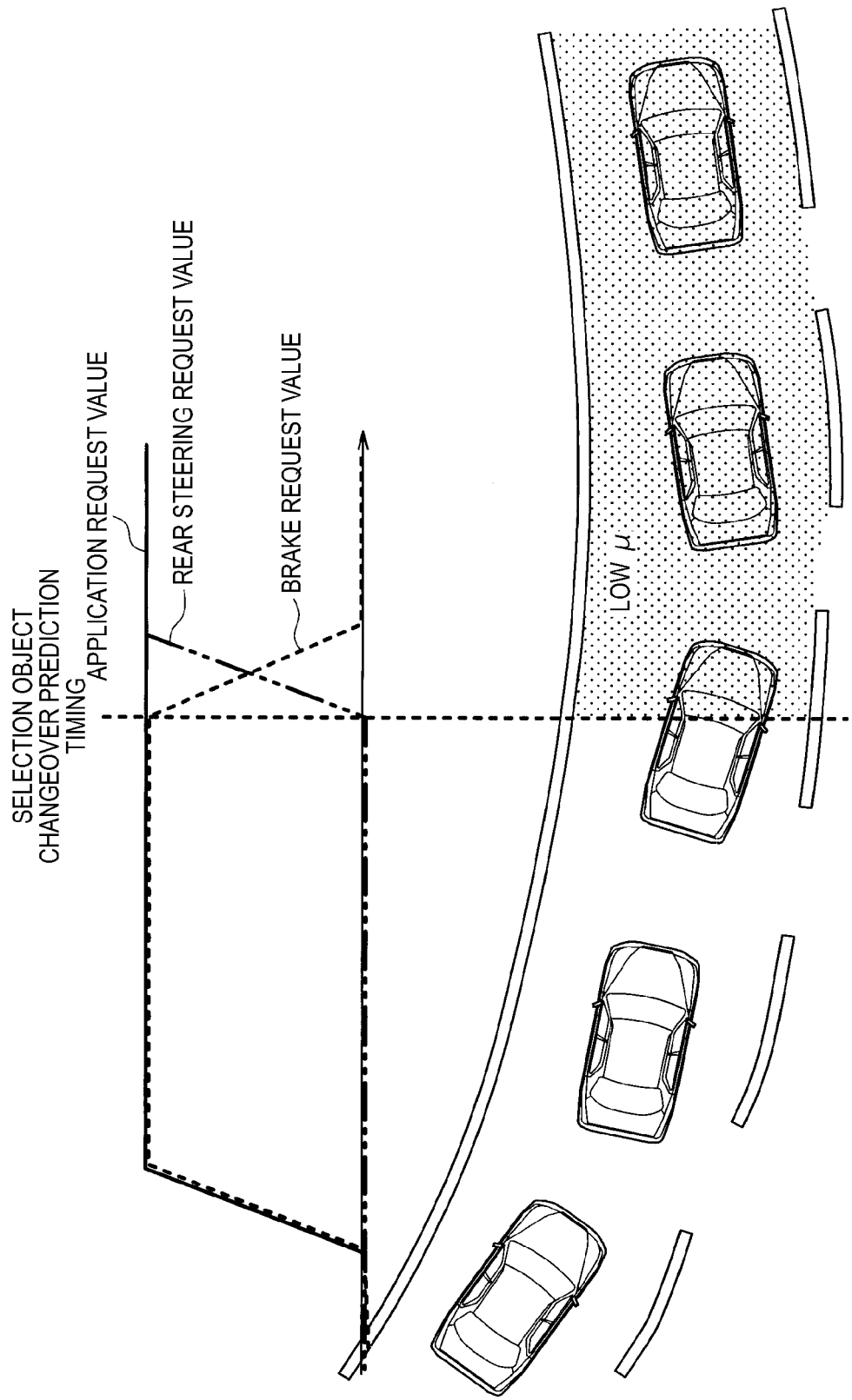
FIG. 12 is a diagram showing the case where low-μ road surface is detected when the lateral motion of a vehicle is being controlled by braking control based on an application request.

In addition, the second selection timing determination portion 61*db* also has a function of predicting changeover so as to perform prediction of changeover of a control object according to the change in the vehicle state. FIG. 12 is a diagram showing the case where low-μ road surface is detected when the lateral motion of a vehicle is being controlled by brake control, based on an application request.

When a vehicle state changes, if a currently selected control object is maintained as it is, there may be unfavorable cases or the control action may not satisfy an application request. In this case, it is preferred that the selected control object be not maintained as it is, but the selection of a control object change to other control object in order to satisfy the application request. Because of this, the situation in which the selection of a control object should change is predicted based on the vehicle state, and a control object is reconsidered and reselected using the prediction timing as control object selection changeover timing.

For example, as shown in an example of FIG. 12, in a case where the lateral motion of a vehicle is being controlled with brake control, if the road surface is detected to be low-μ road surface based on a slip of a front wheel as vehicle information, when a brake is operated on the rear wheel side, there is a possibility to create a rear wheel slip. In this case, it is preferred that a control object changes from the brake to the rear steering in order to aid vehicle stability. That is, the time when the road surface is detected to be a low-μ road surface is determined as control object selection changeover timing, and the selected control object is reconsidered at that timing, so that it is possible to select a more appropriate control object based on the vehicle information.

That is, when a vehicle state included in vehicle information changes, the time when for example, a vehicle reduced the speed at a downhill road is determined as the selection timing, and the selected control object is reconsidered based on this timing. Accordingly, it is possible to select a more appropriate control object based on the vehicle information. In addition, the situation in which the selection of a control object should change is predicted based on the change in the vehicle state included in vehicle information, and a control object is reconsidered and reselected using the prediction timing as control object selection changeover timing. Accordingly, it is possible to select a more appropriate control object based on the vehicle information.

Figure 13:
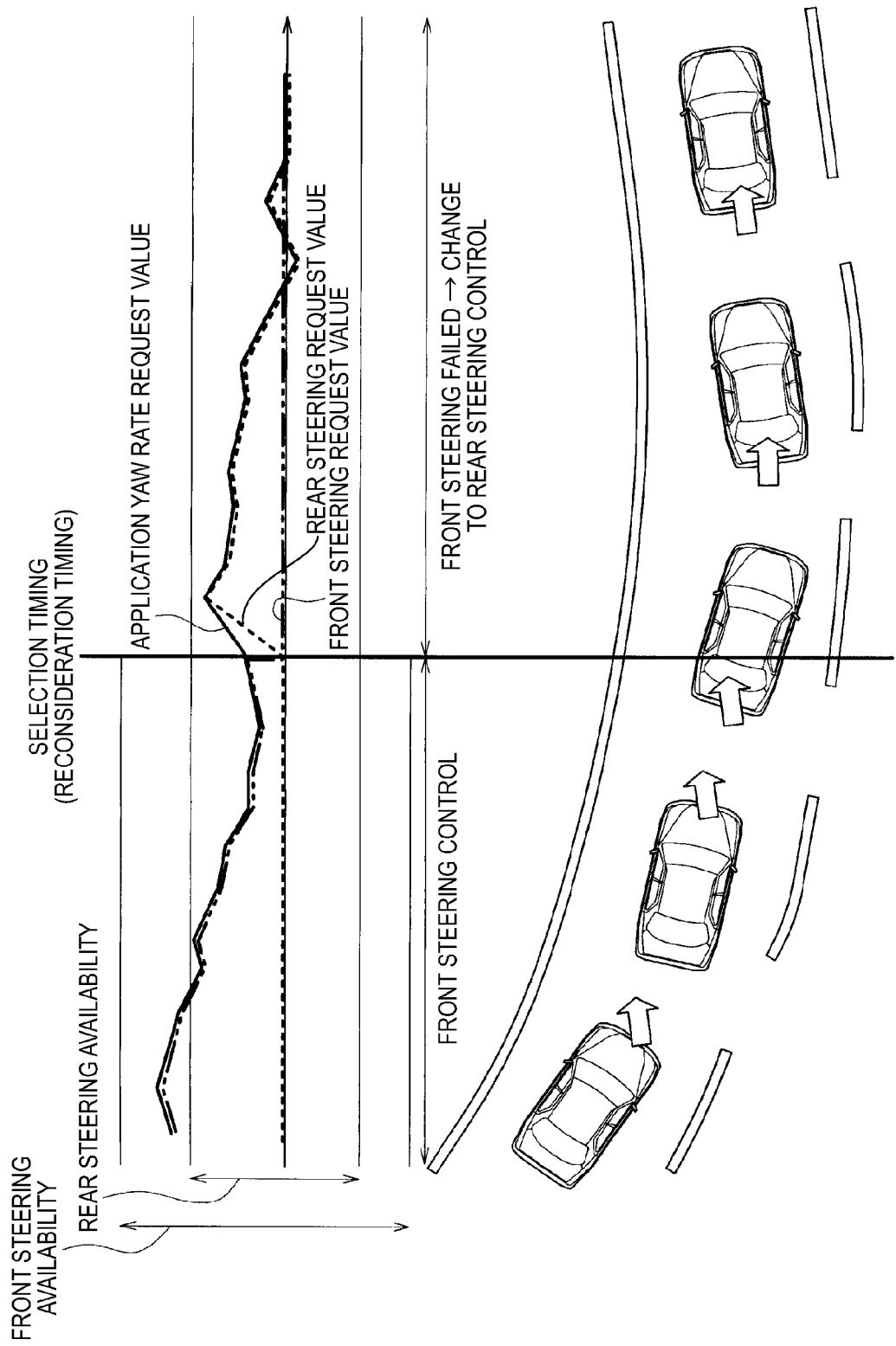
FIG. 13 is a diagram showing a vehicle behavior and a change in the availability when ACTs 16 and 17 for controlling front steering is failed to be driven.

The third selection timing determination portion 61*dc* determines the control object selection timing based on the change in the availability transmitted from the availability operation unit 5. The change in the availability may include the change in e.g. the function of the ACTs 16 to 19. With regard to this, a vehicle behavior and a change in the availability when ACTs 16 and 17 for controlling front steering have failed to be driven will be described with reference to FIG. 13.

For example, while the lateral motion of a vehicle is being controlled based on a request from an application, if a control object currently used to control the lateral motion of a vehicle fails to operate, the control for the lateral motion of a vehicle using the failed control object cannot be performed. Because of this, the control object selection timing determination section 61*d* monitors respective availability calculated by the availability operation unit 5, and if certain availability changes sharply, e.g. if the availability variation per unit time exceeds a certain threshold value, it determines the timing as selection timing, and it outputs a signal instructing the control object selection part 61 to select a control object. Based on this, the control object selection part 61 repeats the selection of a control object using the above-mentioned method to reconsider the selection of a control object, thereby reselecting a control object according to the change in the availability. For example, like the example of FIG. 13, if the availability of front steering changes sharply due to a fail in the front steering, a control object is reselected accordingly, and the control for the lateral motion of a vehicle is performed with respect to not-failed rear steering. That is, it is possible to reconsider a control object according to the change in the availability.

In the meantime, while a foregoing description has been made of the case where the front steering failed to operate, the rear steering becomes a selected control object, if the maximum control amount by the rear steering control does not reach an application request value, a brake becomes a selected control object, rather than the front steering and the rear steering, so that the control for the lateral motion of a vehicle which satisfies the application request value is performed.

In addition, the third selection timing determination portion 61$dc$ also has a function of predicting changeover so as to perform prediction of changeover of a control object according to the change in the availability. FIG. 14 is a diagram showing the case where the availability of front steering decreases when the lateral motion of a vehicle is being controlled by front steering control based on an application request.

When the availability changes, the availability of the selected control object may decrease not to satisfy an application request value. In this case, it is preferred that the selected control object be not maintained as it is, but it changes to other control object as the availability decreases, in order to satisfy the application request value. Because of this, the situation in which the selection of a control object should change is predicted based on the change in the availability, and a control object is reconsidered and reselected using the prediction timing as control object selection changeover timing.

For example, like the example of FIG. 14, if the availability of the front steering decreases, whereas the availability of the rear steering increases, the control object selection changeover prediction timing can be determined when the following two conditions are established.

brake VLP-γ availability≥front steering VLP-γ availability×margin　　　　Condition (1)

application request value>front steering VLP-γ availability ($n$)−front steering VLP-γ availability ($n$−1)×time　　　　Condition (2)

In the condition (2), the time is a value taking brake-spoiled time and responsiveness into account, and it is set to e.g. about 200 ms. In the condition (1), the margin is a control margin of the brake availability, which amounts to a value, e.g. 120%, enough to cope with an application request.

The conditions (1) and (2) are set such that the number of reconsideration of a control object is reduced as fewer as possible, and the situation in which the application request value cannot be achieved under the front steering control can be exactly determined. That is, a point T in the FIG. 14 indicates the timing considering the time from the timing when as the front steering VLP-γ availability decreases below the application request value, it cannot satisfy the application request value, to the time when the brake control increases based on responsiveness of the brake control. Here, a requested value (requested yaw rate final value) for the front steering should be reduced, and a deficiency of front steering control should be supplemented by the brake control. That is, in a case where the right side of the condition (2) cannot satisfy the application request value, this condition is determined as control object selection changeover prediction timing. This is because even if the control amount of brake control increases, a period during which the application request value cannot be satisfied may be created.

However, although the condition (2) is satisfied, if the brake VLP-γ availability is not higher than the front steering VLP-γ availability, the control object cannot be changed from the front steering to the brake with the selection of a control object. Because of this, the condition (1) is provided, so that the number of reconsideration of a control object is reduced as fewer as possible.

That is, the time when the availability changes, e.g. the time when a control object fails to operate, it is determined as the selection timing, and the selection of a control object is reconsidered at that timing. Accordingly, it is possible to select a more appropriate control object based on the availability. In addition, the situation in which the selection of a control object should change is predicted based on the change in the availability, and a control object is reconsidered and reselected using the prediction timing as control object selection changeover prediction timing. Accordingly, it is possible to select a more appropriate control object based on the availability.

When at least one of the first to third selection timing determination portions 61$da$ to 61$dc$ determines selection timing, the selection timing instruction portion 61$dd$ outputs a signal indicating the selection timing with respect to a control object, based on the determination result. When the signal is output, other elements of the control object selection part 61, i.e. the availability value calculation section 61$a$, the comparison section 61$b$, and the selection section 61$c$ perform the above-mentioned operations to select a control object.

Then, with addition of functional availability (the control amount and variation thereof) of the ACTs 16 to 19 for controlling the respective control objects, it is possible to optimally select how to generate the control amount using the ACTs 16 to 19.

As described above, the VLP according to the present illustrative embodiment performs control operation on a plurality of control objects to control the lateral motion of a vehicle so as to satisfy an application request value. When such control for the lateral motion of a vehicle is performed, the availability (controllable range including the control amount and its variation) of respective control objects is transmitted to the VLP, particularly the F/F operation unit 6 and the F/B operation unit 7 of the VLP, the priority of the control objects that are used to control the lateral motion of a vehicle is determined based on the availability, and the control object is selected based on the priority.

That is, since the control object is selected by determining the priority of the control objects used to control the lateral motion of a vehicle while taking account the availability of respective control objects, it is possible to select a more appropriate control object and control the lateral motion of a vehicle according to the availability of the control object.

In addition, the control object is selected by determining the priority of the control objects used to control the lateral motion of a vehicle based on the request mode such as comfort mode or safety mode from an application. Because of this, it is possible to select a control object according to the priority that is suitable for situations such as the case that gives priority to the comfortableness without considering responsiveness, the case that gives a priority to the responsiveness in response to the emergency feature, or the like.

Further, the application request or vehicle state, and the availability of respective control objects calculated by the availability operation unit 5 are used as a priority determination condition, and the selection timing for the control objects is determined based on the priority determination condition. That is, after a control object is first selected according to a request, if the application request or vehicle state, and the availability of respective control objects, which are a condition to determine the priority when control objects are selected, change, the control object is reconsidered and reselected based on the change in the priority determination condition. Accordingly, it is possible to more optimally select a control object and smoothly control the lateral motion of a vehicle.

Alternative Illustrative Embodiment

While the above illustrative embodiment has described a VLP that controls the motion, e.g. lateral motion, of a vehicle, the inventive concept of the present invention is also applicable to a vehicle motion controller that controls the forward and backward motion or rolling motion of a vehicle.

That is, the inventive concept of the present invention is also applicable to a vehicle motion controller for a vehicle motion control system in which a plurality of control objects are provided, and which is capable of controlling the plurality of control objects in a same direction of vehicle motion control. In this case, the availability of the respective control objects is transmitted to the vehicle motion controller, and the priority of the control objects used to control the motion of a vehicle is determined while taking account the availability transmitted to the vehicle motion controller, so that it is possible to more optimally select a control object and control the motion of a vehicle.

For example, for the control of the forward and backward motion of a vehicle, a brake or a driving force (engine power or motor power) can be used as a control object, and for the control of the rolling motion of a vehicle, a suspension or a stabilizer can be used as a control object. In addition, while the above illustrative embodiment has illustrated the ACTs for controlling respective control objects in order to control the lateral motion of a vehicle, the present invention may employ other ACTs. For example, while the above illustrative embodiment employs the ESC-ACT 19 for brake control, the present invention may use a parking brake or an in-wheel motor that controls axle torque applied to respective wheels, in order to control a driving force.

Further, while the above illustrative embodiment has illustrated that the control objects are reconsidered and reselected according to the above-mentioned change in the priority determination condition, the control objects can be reconsidered and reselected according to the change other than the above-mentioned change in the priority determination condition. Even with such configuration, the same effect as the above illustrative embodiment can be obtained.

Further, while the above illustrative embodiment has illustrated that the emergency status under which the vehicle motion should be controlled may be determined based on the request mode according to the content of an application, the emergency status may be expressed by a numeral value, and it may be determined to be high or low based on whether the numeral value exceeds a threshold value or not. Here, if the emergency status is high, a control object with high variation in the control amount may be first selected, and if the emergency status is low, a control object with high maximum control amount may be first selected.

What is claimed is:

1. A vehicle motion control apparatus configured to control a plurality of control objects in a same direction of vehicle motion control to achieve a requested control amount, the vehicle motion control apparatus comprising:
   an availability acquisition unit which is configured to acquire an availability of each control object, which varies according to a state of the corresponding control object, the availability corresponding to a controllable range including a maximum control amount and a variation of the control amount of each control object;
   a control object selection unit which is configured to determine priority of the control objects used for the vehicle motion control based on a priority determination condition, to select a control object from among the plurality of control objects,
   wherein the control object selection unit includes a control object selection timing determination section configured to detect a change in the priority determination condition, and to cause the control object selection unit to reselect a control object at a timing of the change detection as a selection timing, and
   wherein the control object selection timing determination section determines, as the selection timing, a timing when detecting a change in at least one of the availability of each control object, which varies according to the state of the corresponding control object, vehicle information indicative of a vehicle state, and a requested control amount and a requested variation of the control amount from an application executing the vehicle motion control.

2. The vehicle motion control apparatus according to claim 1,
   wherein the control object selection unit uses the maximum control amount or the variation of the control amount, which correspond to the availability, as the priority determination condition, and
   wherein the control object selection timing determination section determines a timing when a variation of the maximum control amount or the variation of the control amount, which correspond to the availability, per a unit time, exceeds a threshold value, as the selection timing.

3. The vehicle motion control apparatus according to claim 1,
   wherein the control object selection unit uses the maximum control amount or the variation of the control amount, which correspond to the availability, as the priority determination condition, and
   wherein the control object selection timing determination section predicts a situation where a control object to be selected should change, based on a change in the maximum control amount or the variation of the control amount, which correspond to the availability, and determines a timing when the situation is predicted, as the selection timing.

4. The vehicle motion control apparatus according to claim 1,
   wherein the control object selection unit uses the vehicle information as the priority determination condition, and
   wherein the control object selection timing determination section determines a timing when the vehicle state indicated by the vehicle information is changed, as the selection timing.

5. The vehicle motion control apparatus according to claim 1,
   wherein the control object selection unit uses the vehicle information as the priority determination condition, and wherein the control object selection timing determination section predicts a situation where a control object to be selected should change, based on a change in the vehicle state indicated by the vehicle information, and determines a timing when the situation is predicted, as the selection timing.

6. The vehicle motion control apparatus according to claim 5,
wherein the control object selection timing determination section determines a timing when a road surface state which is the vehicle state indicated by the vehicle information is changed, as the selection timing.

7. The vehicle motion control apparatus according to claim 1,
wherein the control object selection unit uses the request from the application as the priority determination condition, and
wherein the control object selection timing determination section acquires, as the request from the application, at least a request mode indicating either one of a comfort mode of performing the vehicle motion control while giving a priority to comfortableness and a safety mode of performing the vehicle motion control while giving a priority to safety, and determines a timing when the request mode is changed, as the selection timing.

* * * * *